(12) United States Patent
Oikawa

(10) Patent No.: US 8,630,002 B2
(45) Date of Patent: Jan. 14, 2014

(54) IMAGE FORMING APPARATUS, METHOD OF COPYING A DOCUMENT, AND COMPUTER PRODUCT

(75) Inventor: Masahiko Oikawa, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 601 days.

(21) Appl. No.: 12/251,963

(22) Filed: Oct. 15, 2008

(65) Prior Publication Data

US 2009/0040555 A1 Feb. 12, 2009

Related U.S. Application Data

(62) Division of application No. 10/644,002, filed on Aug. 20, 2003, now abandoned.

(30) Foreign Application Priority Data

Aug. 20, 2002 (JP) .................................. 2002-239460

(51) Int. Cl.
*G06F 3/12* (2006.01)
*G06K 15/00* (2006.01)

(52) U.S. Cl.
USPC .............................. 358/1.15; 358/1.16; 399/8

(58) Field of Classification Search
None
See application file for complete search history.

(56) References Cited

U.S. PATENT DOCUMENTS

| | | | | |
|---|---|---|---|---|
| 4,797,706 A | * | 1/1989 | Sugishima et al. | 358/300 |
| 4,910,612 A | * | 3/1990 | Yamazaki | 358/496 |
| 5,689,755 A | * | 11/1997 | Ataka | 399/8 |
| 5,809,363 A | * | 9/1998 | Kitamura et al. | 399/8 |
| 5,812,747 A | * | 9/1998 | Kayano et al. | 358/1.15 |
| 5,883,660 A | * | 3/1999 | Kato et al. | 347/262 |
| 6,192,202 B1 | * | 2/2001 | Doi | 399/8 |
| 6,363,230 B1 | * | 3/2002 | Masai | 399/82 |
| 6,384,928 B2 | * | 5/2002 | Nagasawa et al. | 358/1.15 |
| 6,618,166 B1 | * | 9/2003 | Suzue | 358/1.15 |
| 6,625,406 B2 | * | 9/2003 | Suzuki et al. | 399/75 |
| 7,167,256 B1 | * | 1/2007 | Koike et al. | 358/1.15 |
| 7,345,794 B2 | * | 3/2008 | Matsui | 358/474 |
| 2001/0043360 A1 | * | 11/2001 | Kitamura et al. | 358/1.15 |

FOREIGN PATENT DOCUMENTS

| | | |
|---|---|---|
| JP | 8-116429 | 5/1996 |
| JP | 11-331470 | 11/1999 |
| JP | 11-346296 | 12/1999 |
| JP | 2000-358127 | 12/2000 |
| JP | 2002-44300 | 2/2002 |

* cited by examiner

*Primary Examiner* — Gabriel I Garcia
*Assistant Examiner* — Pawandeep Dhingra
(74) *Attorney, Agent, or Firm* — Oblon, Spivak, McClelland, Maier & Neustadt, L.L.P.

(57) ABSTRACT

One digital copying machine is set as a parent machine and other copying machines are set as child machines. When documents are set both on an ADF of the parent machine and on an ADF of at least one child machine, a CPU of the parent machine performs two types of controls in parallel. In the first control, the ADF of the parent machine automatically feeds each of the original documents, the scanner of the parent machine reads images, and MEM-C or HDD of the parent machine stores the images. In the second control, the ADF of the child machine automatically feeds each of the original documents, the scanner of the child machine reads images, IEEE1394 1/F of the child machine transfers the images to the parent machine, and the MEM-C or the HDD of the parent machine stores the images.

13 Claims, 13 Drawing Sheets

IMAGE FORMING APPARATUS, METHOD OF COPYING A DOCUMENT, AND COMPUTER PRODUCT

CROSS-REFERENCE TO RELATED APPLICATIONS

This application is a divisional Application of, and claims the benefit of priority under 35 U.S.C. §120 from, U.S. application Ser. No. 10/644,002, filed Aug. 20, 2003, now abandoned which claims the benefit of priority under 35 U.S.C. §119 from Japanese Patent Application No. 2002-239460 filed Aug. 20, 2002. The entire contents of each of the above applications are incorporated herein by reference.

BACKGROUND OF THE INVENTION

1) Field of the Invention

The present invention relates to an image forming apparatus, a copying method, and a computer product for an image forming system having a plurality of image forming apparatuses connected via a communication line.

2) Description of the Related Art

When a user makes a photocopy of a document using a conventional image forming apparatus like a digital copying machine, an automatic document feeder (ADF) is usually used. The user sets a desired number of copies by operating a key on an operation panel, sets original documents on a document tray, and then starts copying by pressing a start key on the operation panel. The ADF automatically feeds each sheet of the original documents set on the document tray. A scanner sequentially reads images from each of the documents, and image data read by the scanner are stored in an image memory, repeating the process until all of the documents set on the document tray are read. After the reading process is completed, the image data of the documents stored in the image memory are sequentially transferred to a plotter (i.e. printer) to make photocopies of the original documents by the preset number of copies.

On the other hand, if the ADF is not mounted on the image forming apparatus, the user sets a desired number of copies by operating a key on the operation panel, sets one sheet of original documents on a reading position, for example, on an exposure glass, of the scanner, and starts copying by pressing the start key on the operation panel. The user repeats the process for each of the documents until all of the documents are copied. Each time when a user starts copying, the scanner reads image data from each document, and stores the image data in the image memory. Then the image data are transferred to the plotter repeatedly to make photocopies of the original document by the preset number of copies.

With the conventional image forming apparatus equipped with the ADF, however, when the number of original documents to be copied exceeds a maximum number of sheets that can be accommodated on the document tray, the user has to set a portion of the original documents that can be processed at one time using the ADF, and then repeat the copying process for the rest of the original documents. Consequently, the operation efficiency is poor, and it takes much time to complete copying all of the original documents.

With an image forming apparatus that is not equipped with the ADF, the situation is even worse. When there are a large number of original documents to be copied, the series of operation should be performed with repetition by the number of original documents. Consequently, the operation efficiency is poor, and it takes considerable time to complete copying all of the documents.

SUMMARY OF THE INVENTION

It is an object of the present invention to solve at least the problems in the conventional technology.

The image forming system according to one aspect of the present invention comprises a first image forming apparatus and a second image forming apparatus that are connected to each other via a communication line, wherein the first image forming apparatus includes an image reading unit that reads image data from a document, and the second image forming apparatus includes an image storing unit that stores the image data, and a reading controller that controls the image reading unit to read the image data, and controls the image storing unit to store the image data.

The image forming system according to another aspect of the present invention comprises a first image forming apparatus and a second image forming apparatus that are connected to each other via a communication line, wherein the first image forming apparatus includes a first image reading unit that reads image data from a document, and the second image forming apparatus includes a second image reading unit that reads image data from a document, a image storing unit that stores the image data, and a parallel reading controller that performs in parallel a control of making the second image reading unit read image data from a document that is set on the second image reading unit and making the image storing unit store the image data, and a control of making the first image reading unit read image data from a document that is set on the first image reading unit, transferring the image data to the second image forming apparatus, and making the image storing unit store the image data.

The method of copying according to still another aspect of the present invention, which is employed on a system including a plurality of image forming apparatuses connected to each other via a communication line, comprises setting one of the image forming apparatuses as a master image forming apparatus, and image forming apparatuses other than the master image forming apparatus as slave image forming apparatuses, making the master image forming apparatus acquire image data from the slave image forming apparatus, and making the master image forming apparatus form an image based on the image data acquired from the slave image forming apparatus.

The method of copying according to still another aspect of the present invention, which is employed on a system including a plurality of image forming apparatuses connected to each other via a communication line, comprises setting one of the image forming apparatuses as a master image forming apparatus, and image forming apparatuses other than the master image forming apparatus as slave image forming apparatuses, making the master image forming apparatus acquire image data, making the master image forming apparatus transfer the image data to the slave image forming apparatus, and making the slave image forming apparatus form an image based on the image data received from the master image forming apparatus.

The method of copying according to still another aspect of the present invention, which is employed on a system including a plurality of image forming apparatuses connected to each other via a communication line, comprises setting one of the image forming apparatuses as a master image forming apparatus, and image forming apparatuses other than the master image forming apparatus as slave image forming apparatuses, making the master image forming apparatus acquire image data from the slave image forming apparatus, making the master image forming apparatus store image data acquired from the master image forming apparatus and the image data acquired from the slave image forming apparatus, making the master image forming apparatus transfer a part of the image data stored to the slave image forming apparatus, and making both the master image forming apparatus and the slave image forming apparatus form images based on the image data transferred and the image data stored, respectively, in parallel.

The computer program according to still another aspect of the present invention, which is employed on a system including a plurality of image forming apparatuses connected to each other via a communication line, makes a computer execute setting one of the image forming apparatuses as a master image forming apparatus, and image forming apparatuses other than the master image forming apparatus as slave image forming apparatuses, making the master image forming apparatus acquire image data from the slave image forming apparatus, and making the master image forming apparatus form an image based on the image data acquired from the slave image forming apparatus.

The computer program according to still another aspect of the present invention, which is employed on a system including a plurality of image forming apparatuses connected to each other via a communication line, makes a computer execute setting one of the image forming apparatuses as a master image forming apparatus, and image forming apparatuses other than the master image forming apparatus as slave image forming apparatuses, making the master image forming apparatus acquire image data, making the master image forming apparatus transfer the image data to the slave image forming apparatus, and making the slave image forming apparatus form an image based on the image data received from the master image forming apparatus.

The computer program according to still another aspect of the present invention, which is employed on a system including a plurality of image forming apparatuses connected to each other via a communication line, makes a computer execute setting one of the image forming apparatuses as a master image forming apparatus, and image forming apparatuses other than the master image forming apparatus as slave image forming apparatuses making the master image forming apparatus acquire image data from the slave image forming apparatus making the master image forming apparatus store image data acquired from the master image forming apparatus and the image data acquired from the slave image forming apparatus making the master image forming apparatus transfer a part of the image data stored to the slave image forming apparatus and
making both the master image forming apparatus and the slave image forming apparatus form images based on the image data transferred and the image data stored, respectively, in parallel.

The computer product according to still another aspect of the present invention, which is employed on a system including a plurality of image forming apparatuses connected to each other via a communication line, contains a computer program that makes a computer execute setting one of the image forming apparatuses as a master image forming apparatus, and image forming apparatuses other than the master image forming apparatus as slave image forming apparatuses, making the master image forming apparatus acquire image data from the slave image forming apparatus, and making the master image forming apparatus form an image based on the image data acquired from the slave image forming apparatus.

The computer product according to still another aspect of the present invention, which is employed on a system including a plurality of image forming apparatuses connected to each other via a communication line, contains a computer program that makes a computer execute setting one of the image forming apparatuses as a master image forming apparatus, and image forming apparatuses other than the master image forming apparatus as slave image forming apparatuses, making the master image forming apparatus acquire image data, making the master image forming apparatus transfer the image data to the slave image forming apparatus, and making the slave image forming apparatus form an image based on the image data received from the master image forming apparatus.

The computer product according to still another aspect of the present invention, which is employed on a system including a plurality of image forming apparatuses connected to each other via a communication line, contains a computer program that makes a computer execute setting one of the image forming apparatuses as a master image forming apparatus, and image forming apparatuses other than the master image forming apparatus as slave image forming apparatuses, making the master image forming apparatus acquire image data from the slave image forming apparatus, making the master image forming apparatus store image data acquired from the master image forming apparatus and the image data acquired from the slave image forming apparatus, making the master image forming apparatus transfer a part of the image data stored to the slave image forming apparatus, and making both the master image forming apparatus and the slave image forming apparatus form images based on the image data transferred and the image data stored, respectively, in parallel.

The image forming apparatus according to still another aspect of the present invention, which is connected to another image forming apparatus via a communication line, comprises a remote image reading controller that acquires image data from the another image forming apparatus, and an image storing unit that stores the data.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 4 is an example display of a liquid crystal touch panel 31 shown in FIG. 3 when a power is turned on;

DETAILED DESCRIPTION

Exemplary embodiments of an image forming apparatus, a copying method, a computer program, and a computer product for an image forming system of the present invention are explained in detail with reference to the accompanying drawings.

Figure 2:
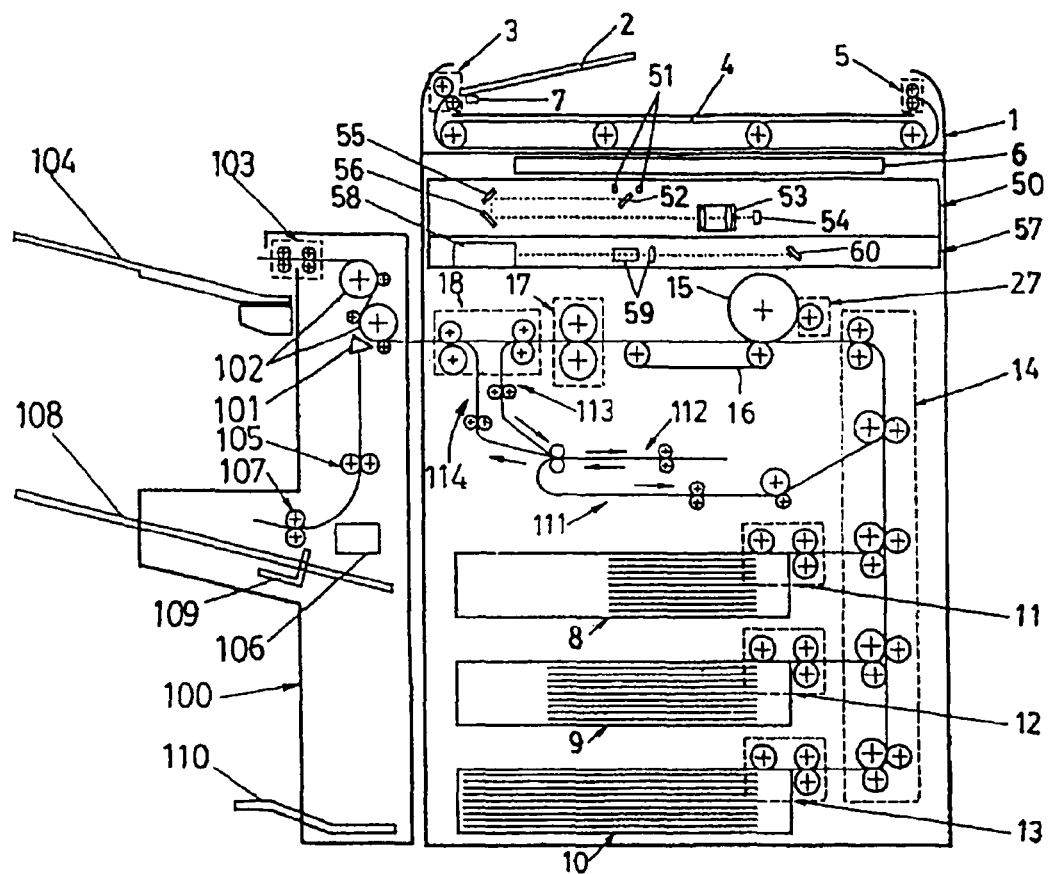
FIG. 2 is a schematic diagram of a digital copying machine as an image forming apparatus according to an embodiment of the present invention.

FIG. 2 is a schematic configuration of one example mechanism section of the digital copying machine such as a multifunction printer (MFP) as an image forming apparatus according to the present invention.

Figure 3:
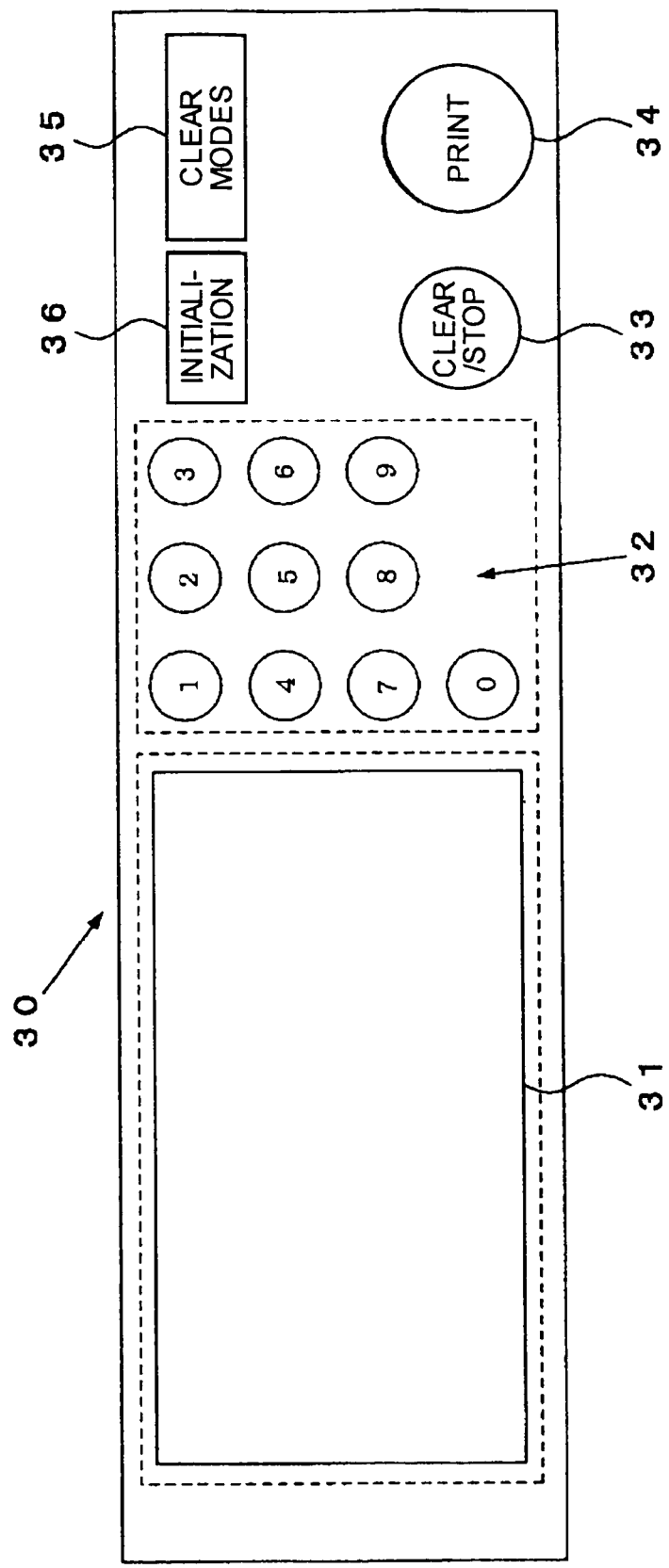
FIG. 3 is a layout of an operation panel of the digital copying machine.

An ADF 1 is mounted on an upper part of a main body of this digital copying machine. A finisher 100 as a post processor is connected to a side of the copying machine. An operation panel 30 shown in FIG. 3 is provided on a front upper surface of the copying machine main body.

Copy operation of this digital copying machine will be explained next. A document is set on an document tray 2 of the ADF 1 of the digital copying machine, with an image surface facing upward. An user presses a print key (i.e., start key) 34 on the operation panel 30 in a copying mode. Then, a feed roller 3 and a feed belt 4 sequentially feed each sheet of original document onto an exposure glass 6 starting from the bottom of the document, thereby to set the sheets at a predetermined position. A scanner (i.e., an image reading unit) 50 reads an image from each sheet of the original document. The feed belt 4 and a discharging roller 5 discharge the read sheets of the document.

Each time when an image is read from one sheet of original document, a document set detector 7 detects whether there is a next sheet of original document on the document tray 2. When there is a next sheet of original document, the feed roller 3 and the feed belt 4 feed the sheet onto the exposure glass 6 in a similar manner that for the preceding sheet of original document. Thereafter, a similar operation is repeated.

A common motor (not shown) drives the feed roller 3, the feed belt 4, and the discharging roller 5.

A first paper feeder 11, a second paper feeder 12, and a third paper feeder 13 feed transfer sheets that are mounted on a first paper feed tray 8, a second paper feed tray 9, and a third paper feed tray 10 respectively. A longitudinal conveyer unit 14 conveys a transfer sheet to a position where the sheet is in contact with a photosensitive drum 15. The longitudinal conveyer unit 14 selects any one of the paper feed trays 8 to 10, and feeds the transfer sheet.

Figure 1:
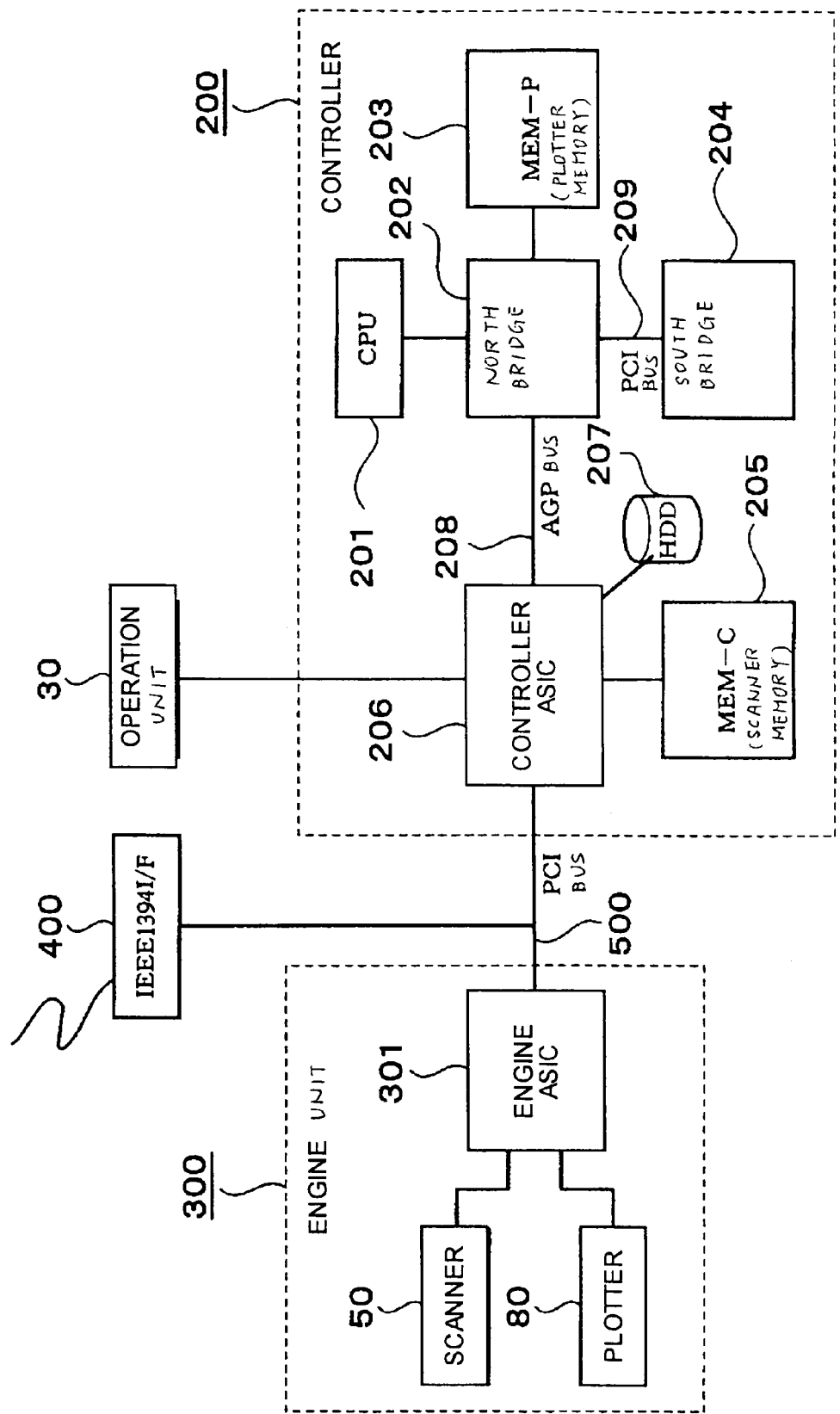
FIG. 1 is a block diagram of a control system for a digital copying machine.

The document image data (i.e., image information) read by the scanner 50 is temporarily stored in an MEM-C 205 or an HDD 207 as the image memories shown in FIG. 1. The image data is then transferred to a writing unit 57 within a plotter 80 as the image forming unit. The writing unit 57 emits a laser beam to write the image data onto the surface of the photosensitive drum 15 that is charged in advance by a charger (not shown). When the image-data written portion passes through a developing unit 27, the developing unit 27 forms a toner image onto this portion.

Alternatively, the document image data read by the scanner 50 is stored in the MEM-C 205 or the HDD 207. When all the document images are read, the image data are sequentially transferred to the writing unit 57 within the plotter 80. The writing unit 57 emits a laser beam to write the image data onto the surface of the photosensitive drum 15 charged in advance. When the image-data written portion passes through the developing unit 27, the developing unit 27 forms a toner image onto this portion.

A conveyer belt (i.e. transfer belt) 16 conveys the transfer sheet fed from the selected paper feed tray, at the same speed as that of the rotation of the photosensitive drum 15, thereby to transfer the toner image from the photosensitive drum 15 onto one side of the transfer sheet. A fixing unit 17 thermally fixes this toner image.

Thereafter, in a one-sided copying mode, a paper discharging unit 18 conveys the transfer sheet to the finisher 100 as the post processor.

When a transfer sheet formed with a toner image on one side of the sheet is to be inverted in order to face down the sheet to set the sheets in the page order, the paper discharging unit 18 conveys this transfer sheet to a two-sided paper conveying route 113. An inverting unit 112 inverts the sheet. The inverted sheet is conveyed to the finisher 100 via the inverted sheet conveyer route 114.

The finisher receives the transfer sheet having the toner image formed on its one side, sent from the copying machine main body. A branch deflection plate 101 of the finisher 100 selectively guides the transfer sheet to a stacker conveyer roller (i.e., normal paper discharging roller) 102 or a stapler conveyer roller 105.

In other words, when the branch deflection plate 101 is switched to face upward, the transfer sheet from the copying machine main body can be discharged to a stacker tray (i.e., normal paper discharge tray) 104 via the stacker conveyer roller 102 and a stacker paper discharge roller 103.

The stacker tray 104 is a paper discharge tray that can be moved forward and backward. The stacker tray 104 moves forward and backward for each document or for each copy sorted by using the MEM-C 205 or the HDD 207, and easily sorts the discharged transfer (i.e., copy) sheets.

When the branch deflection plate 101 is switched to face downward, a one-side copied transfer sheet sent from the copying machine main body can be discharged to a staple tray 108 via a stapler conveyer roller 105 and a stapler paper discharge roller 107.

Each time when one sheet of transfer paper is discharged to the staple tray 108, an edge aligning jogger (i.e., drop stopper) 109 aligns the sheet. A stapler 106 staples one set of copied paper. The transfer sheets stapled by the stapler 106 drop onto a stapled-paper discharge tray (i.e. drop tray) 110 based on the own weight of the paper, and are accommodated on this tray.

On the other hand, in a two-sided copying mode, the paper discharging unit 18 conveys a one-side copied transfer sheet (having a toner image formed on one side thereof) to the two-sided paper conveying route 113. The inverting unit 112 inverts the sheet with a switchback method. The inverted sheet is conveyed to a two-sided paper conveyer unit 111.

The two-sided paper conveyer unit 111 feeds the received transfer sheet, and the longitudinal conveyer unit 14 conveys the transfer sheet again to a position where the sheet is in contact with the photosensitive drum 15. The toner image formed on the photosensitive drum 15 is transferred onto the other side of the paper. The fixing unit 17 fixes this toner image. The paper discharging unit 18 conveys the transfer sheet to the finisher 100. Thereafter, operation similar to that explained above is carried out.

A main motor (not shown) drives the photosensitive drum 15, the conveyer belt 16, the fixing unit 17, the paper discharging unit 18, and the developing unit 27. Paper feed clutches transmit the driving of the main motor to the corresponding paper feeders 11 to 13 respectively to drive these feeders. An intermediate clutch transmits the driving of the main motor to the longitudinal conveyer unit 14 to drive this unit. The image forming section including the writing unit 57 constitutes the block 80 shown in FIG. 1.

FIG. 3 is a layout view of the operation panel 30 that is provided in the main body of the digital copying machines.

The operation section 30 comprises a liquid-crystal touch panel 31, a ten-key 32, a clear/stop key 33, a print key 34, a clear modes key 35, and an initialize key 36.

The liquid-crystal touch panel 31 comprises a touch panel on the surface of a liquid crystal display, and can display messages about each function key, a number of sheets, a machine condition, etc.

The ten-key 32 is used to input a number of printing sheets, a magnification, etc.

The clear/stop key 33 is used to clear a numeric (i.e., copy number), or stop the operation currently carried out (i.e., reading or printing operation).

The print key 34 is used to instruct a starting of a copy operation.

The clear modes key 35 is used to clear all contents of a set mode.

The initialize key 36 is used to optionally customize an initialization state of the machine. In the present embodiment, the user presses the initialize key 36 to display an initialization menu screen on the liquid-crystal touch panel 31.

Figure 4:
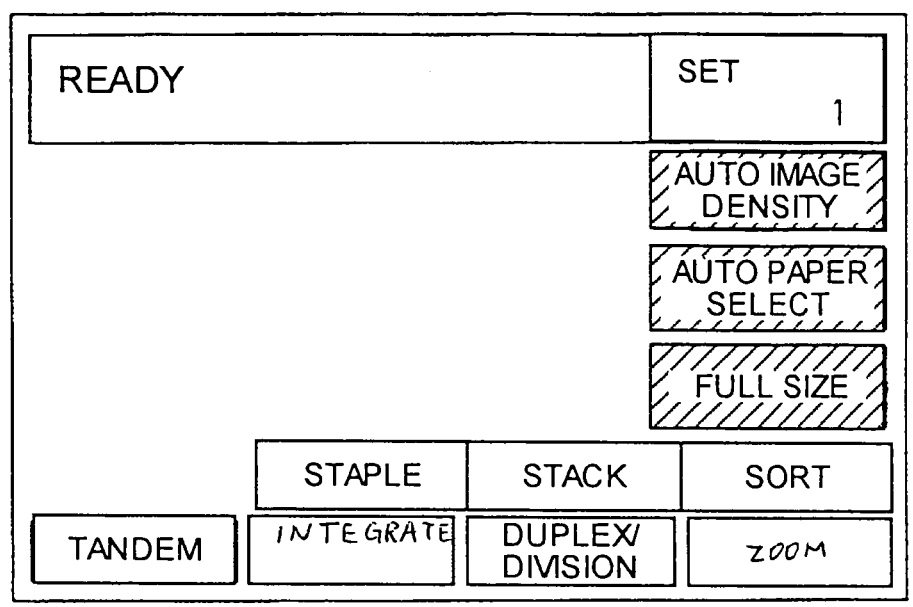

FIG. 4 is an illustration of one example of an operation panel screen displayed on the liquid crystal touch panel 31 when a power source is turned on.

When the user touches any one of function keys of an operation screen displayed on the liquid-crystal touch panel 31, a function (i.e., mode) displayed within a frame of the function key is selected. Then, a white-and-black display is inverted, as indicated by a shaded portion in FIG. 4.

When the user touches the function key, an operation screen for setting a detailed function including a magnification, for example, is displayed, when the setting of the magnification is necessary.

As the liquid-crystal touch panel 31 uses a dot display unit, this touch panel can make an optimum graphical display.

A message area for displaying a message such as "Ready for copying" or "Please wait" is provided at a left upper side of the operation screen shown in FIG. 4. A copying number display section that displays a set number of copying sheets is provided at a right upper side of the operation screen. An auto image density key [Auto Image Density] to assign an automatic adjustment of image concentration is displayed below the copying number display section. An auto paper select key [Auto Paper Select] to assign an automatic selection of a transfer sheet is displayed below the auto image density key. A full size key [Full Size] to assign a full size of copy is displayed below the automatic sheet-selecting key.

A sort key [Sort] to assign an arrangement of each set of copied sheets of paper in a page order is displayed at a right side in a second row from the bottom. A stack key [Stack] to assign a sorting of copied sheets of paper for each page is displayed next to the sort key in the same row. A staple key [Staple] to assign a stapling of sorted sheets of paper for each set is displayed next to the stack key in the same row.

A reduce/enlarge key [Reduce/Enlarge] to assign expansion or compression as copy magnification is displayed at a right side of the bottom row. A duplex/division key [Duplex/Division] to assign a two-sided copying mode or a division mode is displayed next to the reduce/enlarge key. A number up key [Number Up] to set a number up copy mode is displayed next to the duplex/division key in the same row. Further, a tandem mode key [Tandem] is displayed next to the number up key in the same row. This key is used to set a tandem mode to carry out a tandem operation of reading or copying to be described later, by simultaneously starting a plurality of digital copying machines that are connected via a communication line.

Keys of a selected mode are displayed in a mesh. When the tandem mode is not selected by the tandem key [Tandem], a single mode for executing a normal copy operation is set. Operation in the tandem mode will be explained in detail later.

The operation from when the scanner 50 reads an image from the document till when an electrostatic latent image corresponding to the image data is formed on the surface of the photosensitive drum 15 will be explained with reference to FIG. 2. The electrostatic latent image refers to a potential distribution that is generated on the surface of the photosensitive drum 15 (i.e., surface charged by the charger) when a laser beam is emitted onto this surface to write the image data.

The scanner 50 consists of the exposure glass 6 on which the document is mounted, and an optical scanning system. The optical scanning system consists of an exposure lamp 51, a first mirror 52, a lens 53, and a charge coupled device (CCD) image sensor 54.

The exposure lamp 51 and the first mirror 52 are fixed to a first carriage (not shown), and a second mirror 55 and a third mirror 56 are fixed to a second carriage (not shown).

To read an image from the document, the first carriage and the second carriage are mechanically scanned at a relative speed of two to one so as not to change an optical path length.

A driving section including a scanner drive motor (not shown) drives the optical scanning system.

The scanner 50 optically reads the image data from the document, and converts the image into an electric signal. In other words, the exposure lamp 51 of the optical scanning system irradiates the image surface on the document. The CCD image sensor 54 receives an optical image reflected from the image surface, and forms an image onto the light reception surface of the CCD image sensor 54 via the first mirror 52, the second mirror 55, the third mirror 56, and the lens 53. The CCD image sensor 54 converts the formed image into an electric signal.

The lens 53 and the CCD image sensor 54 are moved to the left and right directions in the configuration shown in FIG. 2, thereby to change the image reading magnification in the document feeding direction. In other words, positions of the lens 53 and the CCD image sensor 54 in the left and right directions are set corresponding to the copy magnification set in advance.

The writing unit 57 of the plotter 80 consists of a laser output unit 58, an image condensing lens 59, and a mirror 60. The laser output unit 58 has in its inside a laser diode as a laser beam source, and a polygon mirror that is rotated at a high constant speed by the motor.

The polygon mirror that is rotated at a constant speed deflects the laser beam emitted from the laser output unit 58.

The deflected laser beam passes through the condensing lens 59. The mirror 60 reflects the laser beam. The beam is focused to form an image onto the charged surface of the photosensitive drum 15.

In other words, the laser beam deflected by the polygon mirror scans the photosensitive drum 15 in a direction orthogonal with the rotation direction of the photosensitive drum 15. The laser beam forms an image signal in lines based on the image data output from the image processor (not shown) within the engine application specific integrated circuit (ASIC) 301 shown in FIG. 1. By repeating a main scanning at a predetermined cycle corresponding to the rotation speed of the photosensitive drum 15 and the scanning density or a recording density, an electrostatic latent image is formed on the charged surface of the photosensitive drum 15.

A synchronization detector (not shown) detects a laser beam immediately before scanning the photosensitive drum 15. A laser writing controller (not shown) within the plotter 80 generates a control signal to input and output a laser diode turn-on start timing and image data for each scanning, by using a main scanning synchronization signal output from the synchronization detector.

FIG. 1 is a block diagram of a configuration example of a control system for this digital copying machine.

This digital copying machine has a controller 200, an engine 300, and an Institute of Electrical and Electronic Engineers (IEEE) 1394 interface (I/F) 400 that are connected to each other via a peripheral component interconnect (PCI) bus 500.

The controller 200 controls the whole of the digital copying machine including the control of input from a drawing, communication, and operation section 30. The controller 200 comprises a central processing unit (CPU) 201, a north bridge (NB) 202, a plotter memory (MEM-P) 203, a south bridge (SB) 204, an MEM-C 205, a controller application specific integrated circuit (ASIC) 206, and an HDD 207. The NB 202 and the controller ASIC 206 are connected to each other via an accelerated graphics port (AGP) bus 208. The NB 202 and the SB 204 are connected to each other via a PCI bus 209.

The CPU 201 is a microcomputer that collectively controls the whole of the controller 200, and consists of a central processing unit, a program ROM, and RAM.

The NB 202 connects the CPU 201, the MEM-P 203, the SB 204, and the AGP bus 208 to each other.

The MEM-P 203 is a plotter memory (i.e., drawing memory) that is used to develop the image data to be transferred to the plotter 80 during a printing.

The SB 204 connects the NB 202, and a PCI device, and a peripheral device (not shown), to each other.

The MEM-C 205 is a scanner memory that temporarily stores the image data read by the scanner 50 during a scanning (i.e., reading) or copying operation.

The controller ASIC 206 is an image processing integrated circuit having an image processing hardware element including an editing unit and a compression and expansion unit. The controller ASIC 206 also has a role of a bridge that connects between the AGP bus 208, the PCI bus 500, the HDD 207, and the MEM-C 205.

The editing unit has a function of carrying out an edit processing such as a change of magnification of image data read by the scanner 50 or image data to be transferred to the plotter 80.

The compression and expansion unit has a function of a compressor that compresses (i.e., encodes) normal image data, and an expander that expands (i.e., decodes) the compressed image data.

The HDD 207 is a storage that stores various kinds of data such as a large amount of image data, hysteresis data, and programs including a program relating to the present invention. The HDD 207, the MEM-P 203, and the MEM-C 205 all correspond to the image storage. A large capacity storage such as an optical disk can also be used instead of the HDD 207.

The AGP bus 208 is a bus interface for a graphics accelerator card that is proposed to speed up the graphic processing. The AGP bus 208 makes it possible to directly access the MEM-P 203 at a high throughput to speed up the graphics accelerator card.

The AGP bus 208 is originally used to smoothly display a three-dimensional image. In the present digital copying machine, the NB 202 and the controller ASIC 206 are connected together via the AGP bus 208. When the NB 202 and the controller ASIC 206 are connected together via the PCI bus, performance is lowered. Therefore, the AGP bus 208 is extensively utilized for this purpose.

The engine 300 includes the engine ASI 301 including an image processing section that carries out image processing such as error diffusion and gamma conversion, and a PCI section, in addition to the engine parts such as the scanner 50 and the plotter 80 as described above.

An IEEE13941/F400 is an external communication unit that communicates with other digital copying machines via a communication line, when the tandem mode is set in a state that these other digital copying machines are connected (i.e., in tandem) via a communication line of the IEEE13941 standard as a general-purpose communication line (hereinafter, "communication line"). It is also possible to use an I/F other than the IEEE13941/F400. In this case, the other digital copying machines need to be connected via the I/F communication line.

The CPU 201 operates according to a program relating to the present invention that is stored in the HDD 207, thereby to achieve the functions of the present invention. In other words, the CPU 201 achieves the functions of an external read controller (including a compression controller), an external image forming controller (including an expansion controller), a parallel read controller (including a compression controller, an area securer, a first memory controller, and a second memory controller), a parallel image forming controller (including an expansion controller), and a memory management mode setter, respectively.

Figure 5:
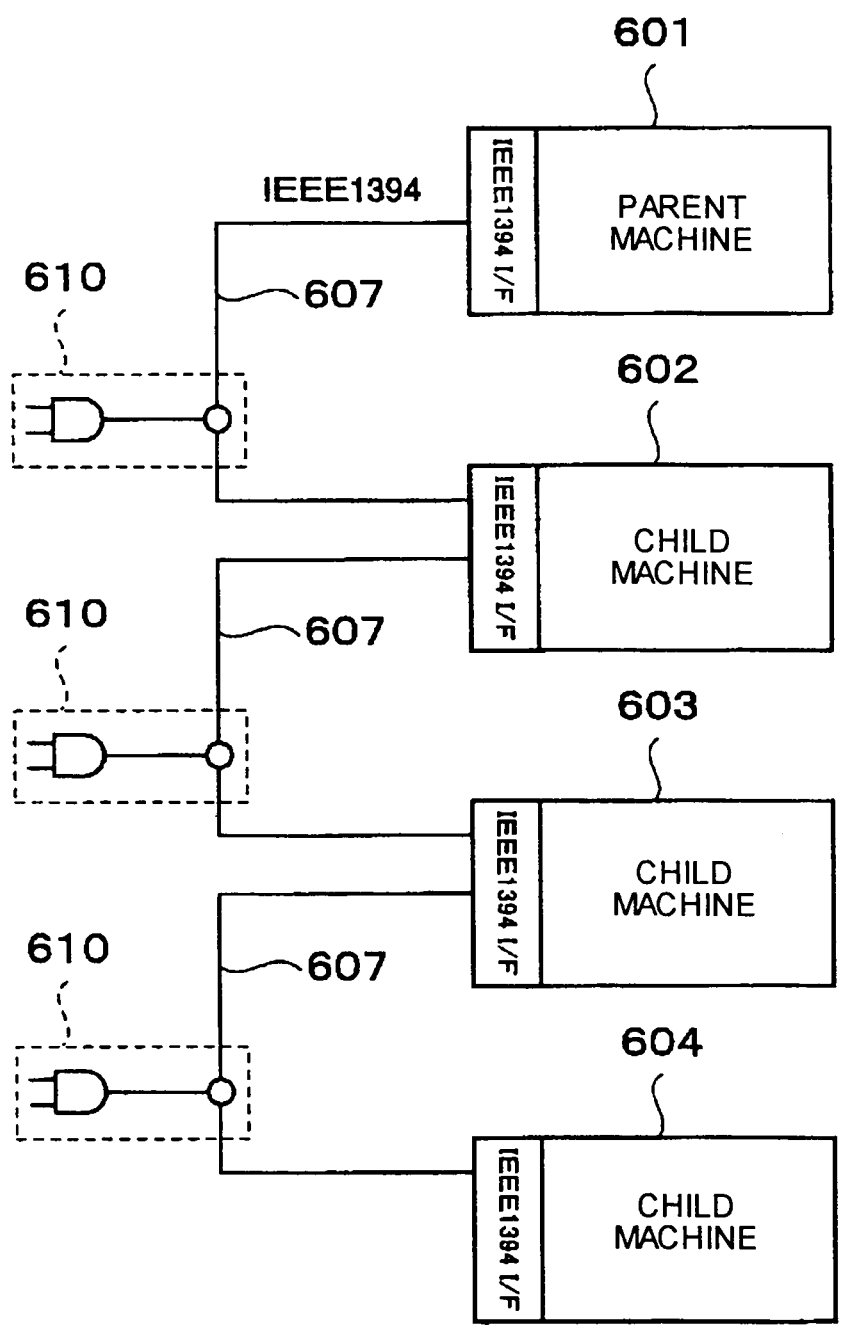
FIG. 5 is an example of an image forming system having a plurality of the digital copying machines.

FIG. 5 is an illustration of one example of an image forming system having a plurality of the digital copying machines connected together.

Four digital copying machines 601 to 604 are connected to each other via a communication line 607 of the IEEE1394 standard that makes it possible to transfer image data at a high speed. The communication line 607 has a limit to the length of the cable. Therefore, when there is a distance between the four digital copying machines 601 to 604, repeaters 610 are inserted into between the copying machines to extensively connect between these copying machines.

When the user operates the key on the operation section 30 of any one of the four digital copying machines 601 to 604 to instruct a setting of the tandem mode, the CPU 201 of this selected digital copying machine sets the tandem mode. The CPU 201 sets the own copying machine as a parent machine, and sets the other three digital copying machines as child machines.

FIG. 5 is an illustration of a state that, based on the key operation on the operation section 30 of the digital copying machine 601, the CPU 301 of this machine sets the following.

The CPU 301 sets the tandem mode, sets the own machine as a parent machine, and sets the digital copying machines 602 to 604 as child machines.

Each of the parent machine and the child machines has the ADF 1 shown in FIG. 2. A large number of sheets of original document are mounted in uniform division onto the document tray 2 of the parent machine and onto the document tray 2 of the ADF 1 of at least one child machine. With this arrangement, a large number of images of the document can be read at a high speed of at least two times the copying speed of one digital copying machine. In many cases, an electronic sort mode or the like is used to copy the large number of sheets of original document. In the electronic sort mode, a large number of sheets of original document are sequentially read and stored in the image memory. All images on the sheets of original document are printed out onto sheets of paper for each set in the order of pages. A plurality of sets of copied sheets of paper are arranged in the order of pages.

The image data read by the scanner 50 of at least one child machine is transferred to the parent digital copying machine 601. When the image data are collectively stored in the MEM-C 205 or the HDD 207, the subsequent processing becomes simple.

When the image data read by the scanner 50 of at least one child machine is stored in the MEM-C 205 or the HDD 207 of this child machine, it becomes necessary to embed image data to print out one set of copy in page order. From this viewpoint, it is preferable that the image data read by the scanner 50 of the child machine are collectively stored in the MEM-C 205 or the HDD 207 of the parent machine.

Processing of the digital copying machines 601 to 604 that constitute the image forming system according to the embodiments of the present invention will be explained in detail below with reference to FIG. 6 and subsequent drawings. The digital copying machine 601 will be regarded as a parent machine for explanation.

The processing of the digital copying machines 601 to 604 according to the first embodiment of the present invention will be explained with reference to FIG. 6 to FIG. 8.

Figure 6:
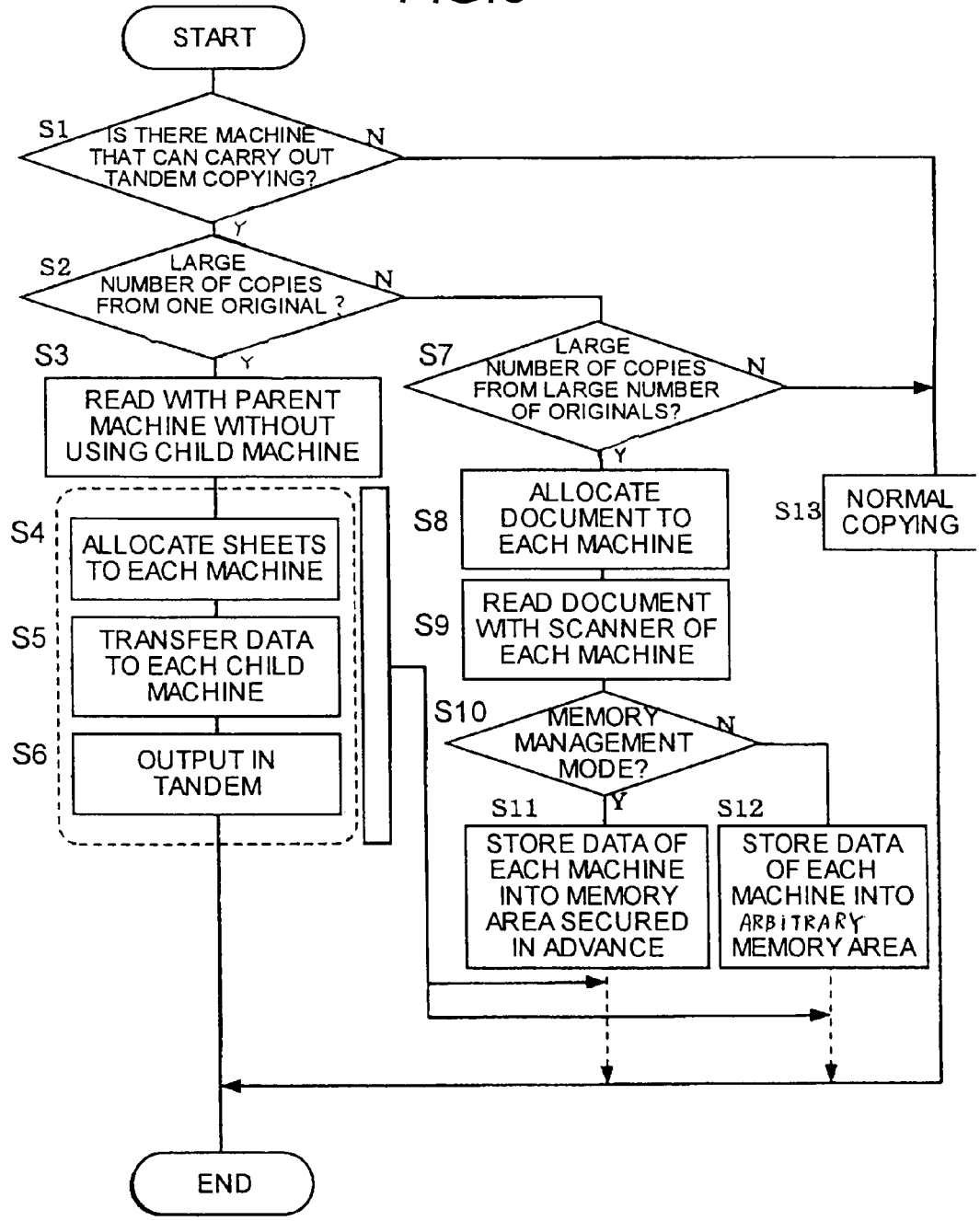
FIG. 6 is a flowchart of an example of a processing operation of a controller 200 shown in FIG. 1 according to the present invention.

FIG. 6 is a flowchart of one example of the processing of the controllers 200 of the digital copying machines 601 to 604 according to the present invention.

Figure 7:
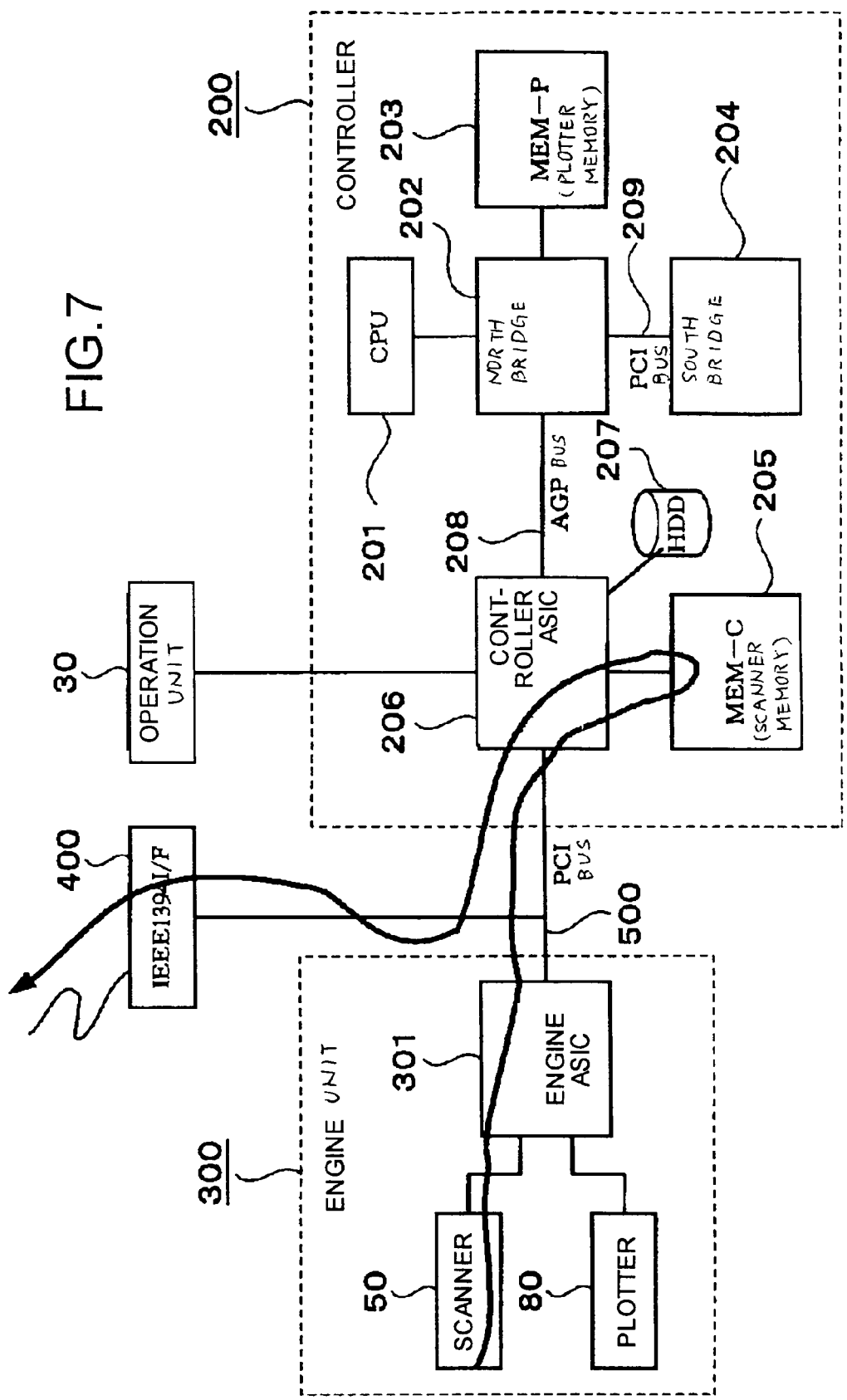
FIG. 7 is an example of a normal process flow of image data without a compression process when the digital copying machine reads images from a document.
Figure 8:
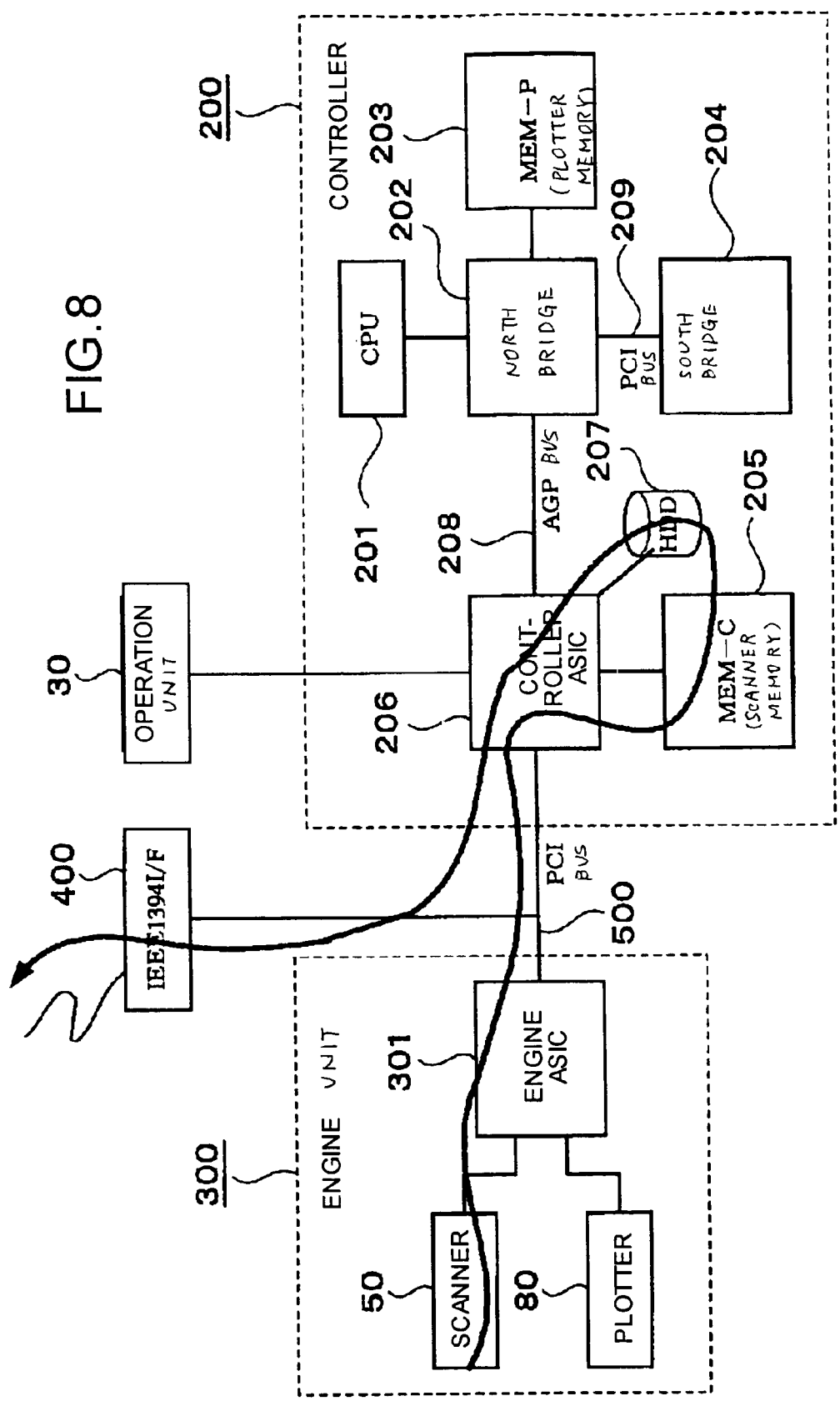
FIG. 8 is another example of a normal process flow of image data when the digital copying machine reads images from a document.

FIG. 7 and FIG. 8 are illustrations of one example of a flow of normal image data that is not compressed when the digital copying machines 601 to 604 read images from a document.

When the user presses the tandem key on the operation section 30 of the digital copying machine 601 to instruct the setting of the tandem mode, the CPU 201 within the controller 200 of this machine 601 sets the tandem mode. The CPU 201 sets the own machine as the parent machine, and sets the other digital copying machines as child machines.

The CPU 201 checks the states of the other digital copying machines.

The CPU 201 transmits a predetermined state confirmation signal to the communication line 607 via the IEEE13941/F400 of the own machine.

When the power source is ON and also when communication is possible, the CPU 201 of each of the digital copying machines 602 to 604 receives the state confirmation signal from the digital copying machine 601 via the IEEE13941/F400 of the own machine. The CPU 201 checks the states of the scanner 50 and the plotter 80 of the own machine. The CPU 201 transmits a state result signal indicating a check result together with a device code of the own machine, to the transmitter digital copying machine 601 via the IEEE13941/F400 of the own machine.

The CPU 201 of the digital copying machine 601 receives the check result together with a device code. The CPU 201 displays the device code and the states of the scanner 50 and the plotter 80 indicated by the state result signal, on the liquid crystal touch panel 31 of the operation section 30. The user reads this display.

The user of the digital copying machine 601 confirms whether there is any other digital copying machine that can copy in the tandem mode, based on the display contents on the liquid crystal touch panel 31 of the operation section 30 (step S1 in FIG. 6). When there is no digital copying machine that can copy, the user operates the key on the operation section 30 to instruct a change of the setting to the single mode. At the same time, the user operates the ten-key 32 on the operation section 30 to input a copying number of sheets. When only one copy is to be made, the input of a numeral "1" is not necessary.

The user sets one sheet of original document on the exposure glass 6 of the scanner 50, and presses the print key (i.e., start key) 34. Alternatively, the user sets one or more sheets of original document on the document tray 2 of the ADF 1, and presses the print key 34.

When the tandem mode is set and also when there is the instruction to change the setting to the single mode, the CPU 201 of the digital copying machine 601 changes the setting of the mode to the single mode.

When the copying number of sheets is input, the CPU 201 sets the copying number of sheets.

When the user presses the print key 34 on the operation section 30 in the state that the single mode is set, the digital copying machine 601 carries out a normal copying (step S13).

In other words, when the document is set on the exposure glass 6 of the scanner 50 of the own machine, the CPU 201 makes this scanner 50 read the image from the document. The CPU 201 makes the image stored in the MEM-C 205 or the HDD 207 of the own machine via the engine ASIC 301, the PCI bus 500, and the controller ASIC 206 as shown in FIG. 7 or FIG. 8. Thereafter, the CPU 201 makes the scanner read the image data of the document stored in the MEM-C 205 or the HDD 207, transfers the image data to the plotter 80 of the own machine via the controller ASIC 206, the PCI bus 500, and the engine ASIC 301. The CPU 201 makes the plotter 80 print out the image to form the image. When the user sets "2" or a larger set number, the CPU 201 makes the scanner 50 read repeatedly the document image data stored in the MEM-C 205 or the HDD 207 of the own machine, by the set number. The CPU 201 makes the image data sequentially transferred to the plotter 80 of the own machine to print out the image.

When one or more sheets of original document are set on the document tray 2 of the ADF 1 of the own machine, the CPU 201 makes this ADF 1 (not shown in FIG. 1) automatically feed each sheet of original document from the document tray 2. The CPU 201 makes the scanner 50 of the own machine sequentially read the images from the sheets of original document. The CPU 201 makes the images stored in the MEM-C 205 or the HDD 207 of the own machine via the engine ASIC 301, the PCI bus 500, and the controller ASIC 206. Thereafter, the CPU 201 makes the scanner sequentially read the image data of the document stored in the MEM-C 205 or the HDD 207, transfers the image data to the plotter 80 of the own machine via the controller ASIC 206, the PCI bus 500, and the engine ASIC 301. The CPU 201 makes the plotter 80 print out the images. When the user sets "2" or a larger number, the CPU 201 makes the scanner 50 sequentially read repeatedly the document image data stored in the MEM-C 205 or the HDD 207 of the own machine, by the set number. The CPU 201 makes the image data sequentially transferred to the plotter 80 of the own machine to print out the images.

On the other hand, when there is at least any one other digital copying machine that can copy in the tandem mode, the user of the digital copying machine 601 operates the key on the operation section 30 to assign one optional machine as a child machine. Even when there is at least any one other digital copying machine that can copy in the tandem mode, the user may not operate the key on the operation section 30 to assign one optional machine as a child machine.

When other digital copying machine is not assigned as a child machine and also when a set number is "1", the user presses the print key 34 of the own machine each time when one sheet of original document is set on the scanner 50 of the own machine. Alternatively, the user sets one or more sheets of original document on the document tray 2 of the ADF 1 of the own machine, and presses the print key 34. In this case, the CPU 201 of the digital copying machine 601 makes the printer carry out the normal copying at step S13 that is the same as the copying operation as described above (at steps S1, S2, S7, and S13).

When other digital copying machine is assigned as a child machine, the CPU 201 of the digital copying machine 601 sets the own machine as a parent machine, and sets the assigned other digital copying machine as a child machine. The IEEE13941/F400 transmits a single operation prohibition signal to this child machine to instruct the prohibition of the single operation.

The child machine receives the single operation prohibition signal, and invalidates the key input to the operation section 30 of the own machine, thereby to prohibit the single operation (i.e., normal copying operation).

The user sets "2" or a larger number as a set number, and presses the print key 34 of the parent machine, each time when one sheet of original document is set to the scanner 50 of the digital copying machine 601 as the parent machine. Alternatively, the user sets a sheet or sheets of original document on the document tray 2 of the ADF 1 of the parent machine, and presses the print key 34. In this case, the CPU 201 carries out the following processing.

When the document is set on the scanner 50 of the own machine, the CPU 201 of the own machine makes this scanner 50 read the image from the document. The CPU 201 makes the image stored in the MEM-C 205 or the HDD 207 of the own machine via the engine ASIC 301, the PCI bus 500, and the controller ASIC 206 as shown in FIG. 7 or FIG. 8. The CPU 201 uniformly allocates the set processing number to the own machine and the child machines respectively, and instructs an allocation number to each child machine. For example, when the set number to the child digital copying machines 602 to 604 is "400", an allocation number "100" is instructed to each child machine.

The CPU 201 carries out the following controls in parallel. The CPU 201 makes the scanner 50 read repeatedly the document image data stored in the MEM-C 205 or the HDD 207 of the own machine, by the allocated number. The CPU 201 makes the IEEE13941/F400 of the own machine sequentially transfer the document image data to the plotter 80 of the own machine to print out the image (steps S1 to S6).

When one or more sheets of original document are set on the document tray 2 of the ADF 1 of the own machine, the CPU 201 makes this ADF 1 automatically feed each sheet of original document from the document tray 2. The CPU 201 makes the scanner 50 of the own machine sequentially read the images from the sheets of original document. The CPU 201 makes the images stored in the MEM-C 205 or the HDD 207 of the own machine via the engine ASIC 301, the PCI bus 500, and the controller ASIC 206. The CPU 201 uniformly allocates the set processing number to the own machine and the child machines respectively, and instructs an allocation number to each child machine. Thereafter, the CPU 201 makes the scanner sequentially read the image data of the document stored in the MEM-C 205 or the HDD 207 of the own machine. The CPU carries out the following control in parallel. The CPU 201 makes the image data transferred to the plotter 80 of the own machine via the controller ASIC 206, the PCI bus 500, and the engine ASIC 301 of the own machine, and makes the plotter 80 print out the images. The CPU 201 makes the IEEE13941/F400 of the own machine sequentially transfer the document image data to the plotter 80 of the own machine to print out the image (steps S1 to S6).

When the document is set to the scanner 50 of the child machine during a period while this scanner 50 is reading the document image, this effect is notified to the own machine from the child machine. Therefore, after the own machine reads the document image, the CPU 201 makes the scanner 50 of the child machine read the image from the document set to the scanner 50. The CPU 201 makes the IEEE13941/F400 of the child machine transfer the document image data to the own machine, and makes the image data stored in the MEM-C 205 or the HDD 207 of the own machine. When the document is set to the document tray 2 of the ADF 1 of the child machine during a period while this scanner 50 of the own machine is reading the document image, this effect is notified to the own machine from the child machine. After the own machine reads the document image, the CPU 201 makes the ADF 1 automatically feed each sheet of original document from the document tray 2 to the scanner 50. The CPU 201 makes the scanner 50 of the child machine read the images of the document set to this scanner 50. The CPU 201 makes the IEEE13941/F400 of the child machine sequentially transfer the document image data to the own machine, and makes the image data stored in the MEM-C 205 or the HDD 207 of the own machine.

When the user presses the print key 34 in a sate that the document is set to only the scanner 50 of the child machine, the CPU 201 makes the scanner 50 of the child machine read the image from the document set to the scanner 50. The CPU 201 makes the IEEE13941/F400 of the child machine transfer the document image data to the own machine, and makes the image data stored in the MEM-C 205 or the HDD 207 of the own machine. When the user presses the print key 34 in a sate that the document is set to only the document tray 2 of the ADF 1 of the child machine, the CPU 201 makes the ADF 1 automatically feed each sheet of original document from the document tray 2 to scanner 50 of the child machine. The CPU 201 makes the scanner 50 of the child machine read the images of the document. The CPU 201 makes the IEEE13941/F400 of the child machine transfer the document image data to the own machine, and makes the image data stored in the MEM-C 205 or the HDD 207 of the own machine.

The user sets "2" or a larger number as a set number, and presses the print key 34 of the parent machine, each time when one sheet of original document is set to the scanner 50 of the parent machine and the scanner 50 of the child machine respectively. Alternatively, the user sets two or more sheets of original document by allocation onto the document tray 2 of the ADF 1 of the parent machine and the document tray 2 of the ADF 1 of the child machine respectively, and presses the print key 34. In this case, the CPU 201 carries out the following processing.

When the document is set on the scanner 50 of the own machine and the scanner 50 of the child machine respectively, the CPU 201 of the own machine makes the scanner 50 of the own machine read the set image from the document. The CPU 201 makes the image stored in the MEM-C 205 or the HDD 207 of the own machine via the engine ASIC 301, the PCI bus 500, and the controller ASIC 206 as shown in FIG. 7 or FIG. 8. At the same time, the CPU 201 of the child machine makes the scanner 50 of the child machine read the set image from the document. The CPU 201 makes the IEEE13941/F400 of the child machine transfer the document image data to the own machine, and makes the image data stored in the MEM-C 205 or the HDD 207 of the own machine (at steps S1, S2, and S7 to S12).

The CPU 201 carries out the following controls in parallel. When the original document is set on the document tray 2 of the ADF 1 of the own machine and on the document tray 2 of the ADF 1 of the child machine respectively, the CPU 201 makes the ADF 1 of the own machine automatically feed each of original document from the document tray 2, and makes the scanners 50 of the own machine sequentially read the images from the document respectively. The CPU 201 makes the images stored into the MEM-C 205 or the HDD 207 of the own machine via the engine ASIC 301, the PCI bus 500, and the controller ASIC 206 as shown in FIG. 7 or FIG. 8. At the same time, the CPU 201 makes the ADF 1 of the child machine automatically feed each sheet of original document from the document tray 2, and makes the scanner 50 of the child machine sequentially read the images from the document. The CPU 201 makes the IEEE13941/F400 of the child machine sequentially transfer the image data to the own machine, and makes the images stored into the MEM-C 205 or the HDD 207 of the own machine (at steps S1, S2, and S7 to S12).

Thereafter, the CPU 201 instructs a uniform allocation of the set number to the own machine and the child machine respectively, and instructs the allocation number to the child machine.

The CPU 201 carries out the following controls in parallel. The CPU 201 makes the scanner 50 read repeatedly the document image data stored in the MEM-C 205 or the HDD 207 of the own machine, by the allocated number. The CPU 201 makes the image data transferred to the plotter 80 of the own machine via the controller ASIC 206, the PCI bus 500, and the engine ASIC 301 of the own machine, and makes the plotter 80 print out the images. The CPU 201 makes the IEEE13941/F400 of the own machine sequentially transfer the read document image data to the plotter 80 of the child machine as well to print out the image (the same steps S4 to S6).

In order to make the MEM-C 205 or the HDD 207 of the own machine store the image data, it is checked whether the memory management mode for managing the MEM-C 205 or the HDD 207 of the own machine is set. The CPU 201 selects a memory control of the image data based on a result of this check (at steps S10 to S12). This processing will be explained in detail later. The user can set the memory management mode in advance by operating the key on the operation section 30.

When the user sets "2" or a larger number as a set number under the setting of the tandem mode, the image data stored in the MEM-C 205 or the HDD 207 of the own machine can be repeatedly read out sequentially by the set number. The image data can be sequentially transferred to the plotter 80 of the own machine via the controller ASIC 206, the PCI bus 500, and the engine ASIC 301 of the own machine, thereby to make the plotter 80 of the own machine print out the images. Alternatively, the image data stored in the MEM-C 205 or the HDD 207 of the own machine can be repeatedly read out sequentially by the set number. The IEEE13941/F400 of the own machine can be made to sequentially transfer the document image data to the plotter 80 of the child machine to print out the images.

According to the first embodiment, when a number of sheets of original document that are required to be copied exceeds a maximum number of sheets that can be mounted on the document tray 2 of the ADF 1 of one digital copying machine, the document sheets can be allocated to the document trays 2 of the ADF 1 of a plurality of digital copying machines. The user operates the key to set a required copy number on the operation section 30 according to a need. Last, the user only presses the print key 34 to instruct the start of copying. Therefore, the user's work efficiency can be improved. Further, the copy time can be shortened.

Alternatively, a part of the document may be set to the document tray 2 of the ADF 1 of one digital copying machine. The user operates the key to set a required copy number on the operation section 30 according to a need. After pressing the print key 34, the user can set the rest of document to the document tray 2 of the ADF 1 of other digital copying machines. With this arrangement, all the document sheets can be read continuously. Therefore, the user's work efficiency can be improved.

When the ADF 1 cannot be used, such as when the ADF 1 is in trouble or is not mounted, for example, one sheet of a large document can be set to each scanner 50 of each of a plurality of digital copying machines. The user operates the key to set a required copy number on the operation section 30 according to a need. Last, the user only presses the print key 34 to instruct the start of copying until when all the document sheets are read out. Therefore, the user's work efficiency can be improved more than that when only one digital copying machine is used. Further, the copy time can be shortened.

In the first embodiment, the document image data read by the scanner 50 of the own or child machine is stored in the MEM-C 205 or the HDD 207 of the own machine. However, when the memory capacity of the MEM-C 205 is not large, the image data can be stored in the HDD 207. In this case, the image data is once stored in the MEM-C 205, and is then transferred to the HDD 207 to store the data. When the image data is stored in the HDD 207 instead of the MEM-C 205, the capacity of the MEM-C 205 used can be minimized. This has also an advantage in that the image data once stored in the HDD 207 is not erased even when the power source is off.

The processing of the digital copying machines 601 to 604 according to the second embodiment of the present invention will be explained with reference to FIG. 9 and FIG. 10.

Figure 9:
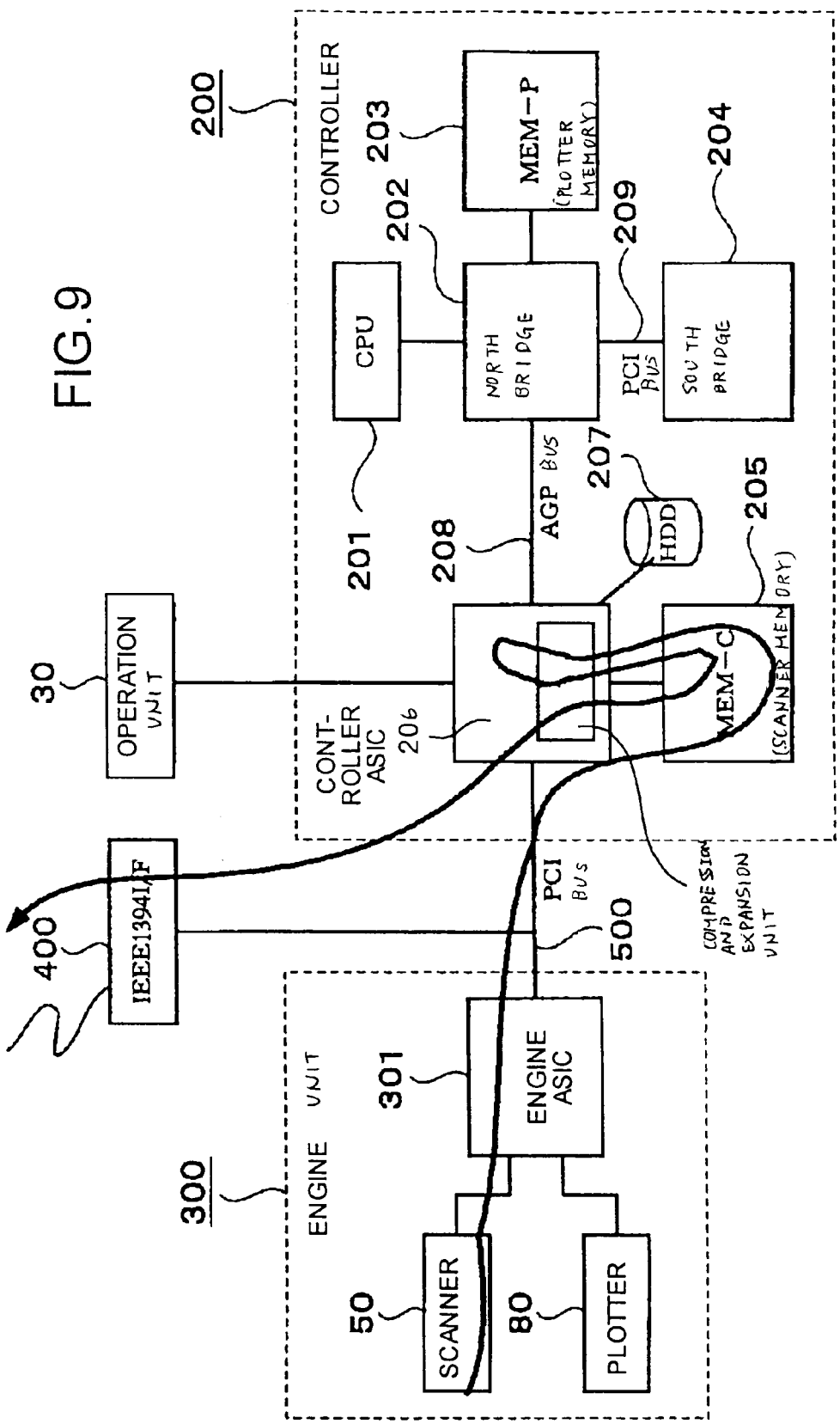
FIG. 9 is an example of a process flow of image data with a compression process when the digital copying machine reads images from a document.
Figure 10:
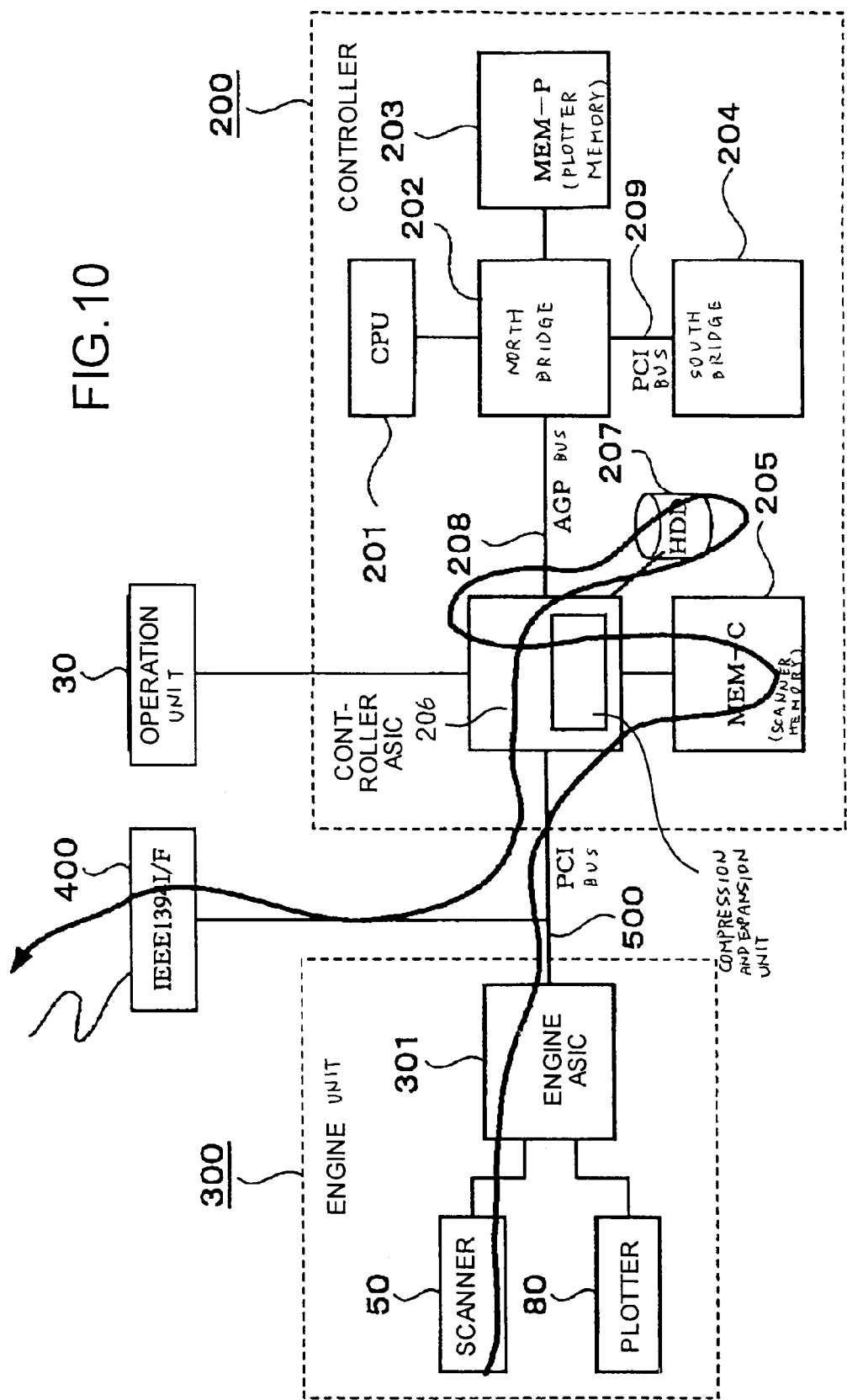
FIG. 10 is another example of a process flow of image data with a compression process when the digital copying machine reads images from a document.

FIG. 9 and FIG. 10 are illustrations of different examples of a flow of image data that is compressed when the digital copying machines 601 to 604 read images from a document.

The second embodiment is different from the first embodiment in that controls of the CPU 201 of the parent digital copying machine 601 are different in points (1) and (2) described below.

(1) The document image data read by the scanner 50 of the own or child machine is stored in the MEM-C 205 or the HDD 207 of the own machine as follows. As shown in FIG. 9 or FIG. 10, the compression and expansion unit within the controller ASIC 206 compresses the image data. The own or child machine makes the plotter 80 print out the image as follows. The compressed image data stored in the MEM-C 205 or the HDD 207 of the own machine is read out. Then, the compression and expansion unit within the controller ASIC 206 expands the image data to restore the original image data.

The document image data read by the scanner 50 of the own or child machine is stored in the HDD 207 of the own machine as follows. As shown in FIG. 10, the compression and expansion unit within the controller ASIC 206 compresses the image data. The compressed image data is once stored in the MEM-C 205 of the own machine, and is then stored in the HDD 207 of the own machine. The own or child machine makes the plotter 80 print out the image as follows. The compressed image data stored in the HDD 207 of the own machine is read out, and is then once stored in the MEM-C 205 of the own machine. The image data is transferred to the controller ASIC 206. The compression and expansion unit within the controller ASIC 206 expands the image data.

(2) The document image data read by the scanner 50 of the own or child machine is stored in the MEM-C 205 or the HDD 207 of the own machine as follows. As shown in FIG. 9 or FIG. 10, the compression and expansion unit within the controller ASIC 206 compresses the image data. The compressed image data stored in the MEM-C 205 or the HDD 207 of the own machine is read out. The compression and expansion unit within the controller ASIC 206 of the own machine expands the image data that is transferred to the plotter 80 of the own machine. However, the compression and expansion unit within the controller ASIC 206 of the child machine does not expand the image data that is transferred to the child machine. In other words, the compressed image data is transferred to the child machine. Then, the compression and expansion unit within the controller ASIC 206 of the child machine expands the image data.

The document image data read by the scanner 50 of the own or child machine is stored in the HDD 207 of the own machine as follows. As shown in FIG. 10, the compression and expansion unit within the controller ASIC 206 compresses the image data. The compressed image data is once stored in the MEM-C 205 of the own machine, and is then stored in the HDD 207 of the own machine. The own or child machine makes the plotter 80 print out the image as follows. The compressed image data stored in the HDD 207 of the own machine is read out, and is then once stored in the MEM-C 205 of the own machine. The image data is transferred to the controller ASIC 206. The compression and expansion unit within the controller ASIC 206 of the own machine expands the image data that is transferred to the plotter 80 of the own machine. The compressed image data to be transferred to the child machine is transferred straight to the child machine. Then, the compression and expansion unit within the controller ASIC 206 of the child machine expands the image data. In other words, the child machine receives the compressed image data from the parent machine, and transfers this data to the controller ASIC 206 of the own machine. The compression and expansion unit within this controller ASIC 206 expands the image data, and once stores the expanded image data into the MEM-C 205 of the own machine. The expanded image data is transferred to the plotter 80 of the own machine to print out the image.

According to the processing explained in (1) and (2) above, the image data stored in the MEM-C 205 or the HDD 207 of the own machine is compressed. Therefore, the capacity of these memories used can be minimized, which can also improve the data transfer speed.

The processing of the digital copying machines 601 to 604 according to the third embodiment of the present invention will be explained with reference to FIG. 11.

Figure 11:
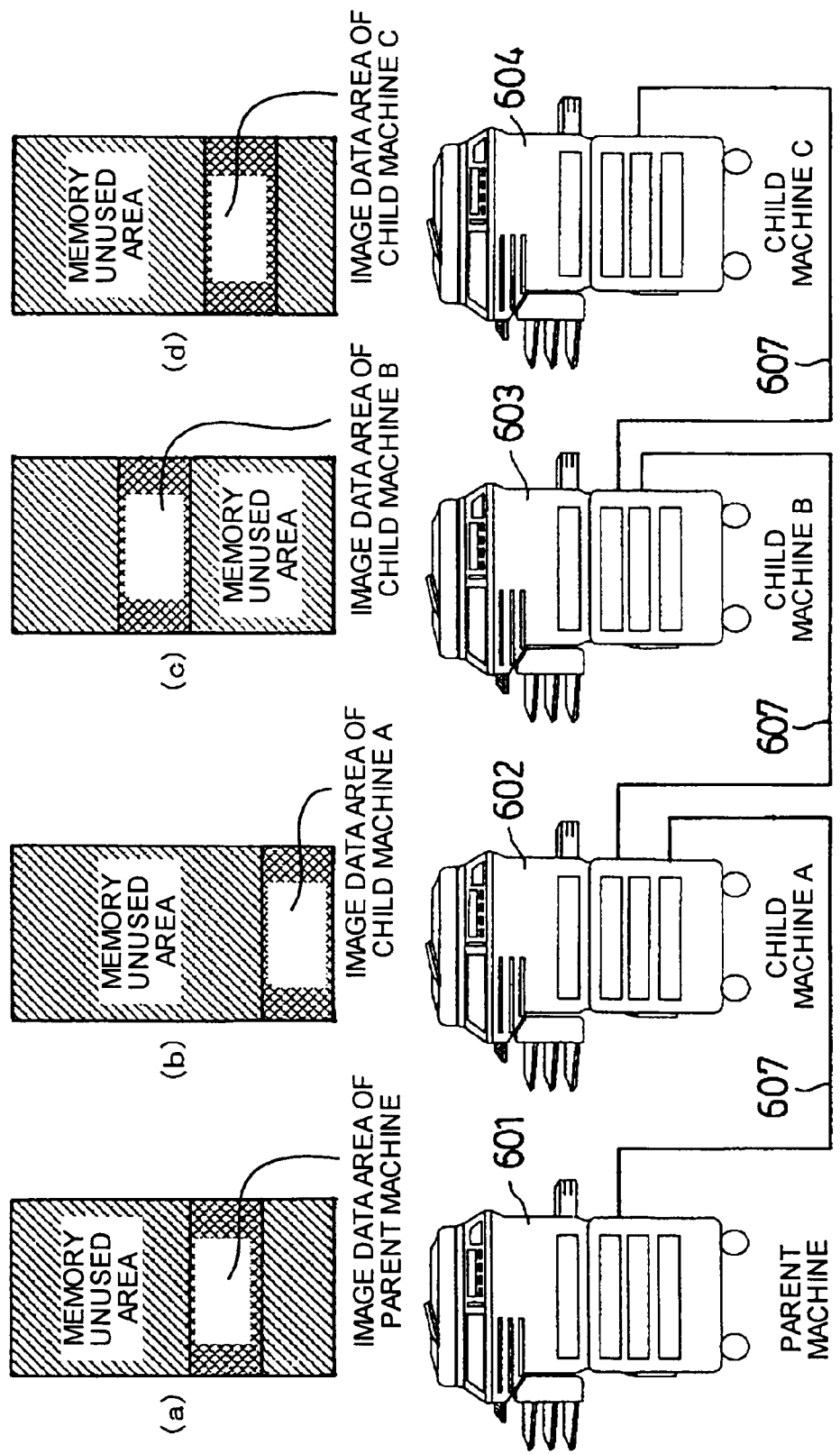
FIG. 11 illustrates a control of image data storing to a scanner memory MEM-C 205 or a hard disk drive HDD 207 in the digital copying machine shown in FIG. 1.

FIG. 11 is an explanatory diagram of a memory control of image data to the MEM-C 205 or the HDD 207 in the digital copying machine shown in FIG. 1.

The third embodiment is substantially the same as the first and second embodiments. In the first and second embodiments, the explanation of the memory control of the image data to the MEM-C 205 or the HDD 207 in the digital copying machines 601 to 604 respectively is omitted. Therefore, this memory control will be explained in the third embodiment. For convenience, the explanation of the compression and expansion of the image data will be omitted.

The user presses the key on the operation section 30 of the own machine, to set the own machine as a parent machine, and set the other digital copying machines 601 to 604 as child machines respectively. The user presses the print key 34 in a state that a large number of sheets of original document are uniformly allocated to the document tray 2 of the ADF 1 of the own machine and the document trays 2 of the ADF 1 of child machines A, B, and C (corresponding to the other digital copying machines 602, 603, and 604). Then, the CPU 201 of the digital copying machine 601 makes the ADF 1 of the own machine automatically feed each sheet of original document from the document tray 2, and makes the scanner 50 of the own machine sequentially read the image from the document. The CPU 201 makes the image stored into an optional unused memory area of the MEM-C 205 or the HDD 207 of the own machine via the engine ASIC 301, the PCI bus 500, and the controller ASIC 206 as shown in FIG. 7 or FIG. 8. At the same time, the CPU 201 makes the ADF 1 of the child machine automatically feed each sheet of original document from the document tray 2, and makes the scanners 50 of the child machines A, B, and C sequentially read the images from the document respectively. The CPU 201 makes the IEEE13941/F400 of the child machines sequentially transfer the document image data to the own machine, and makes the images stored into an optional memory area of the MEM-C 205 or the HDD 207 of the own machine (at steps S1, S2, and S7 to S12).

The CPU 201 of the parent machine makes each image data of the document read by the scanner 50 of the own machine stored into an optional unused memory area of the MEM-C 205 or the HDD 207 of the own machine, as shown in FIG. 11A. The CPUs 201 of the child machines A, B, and C make each image data of the document read by the scanner 50 of the own machine temporarily stored into an optional memory area of the MEM-C 205 or the HDD 207 of the own machine, as shown in FIGS. 11B, 11C, and 11D respectively, for example. The CPU 201 makes the IEEE13941/F400 of the own machine sequentially transfer the stored images to the parent machine.

The processing of the digital copying machines 601 to 604 according to the fourth embodiment of the present invention will be explained with reference to FIG. 12.

Figure 12:
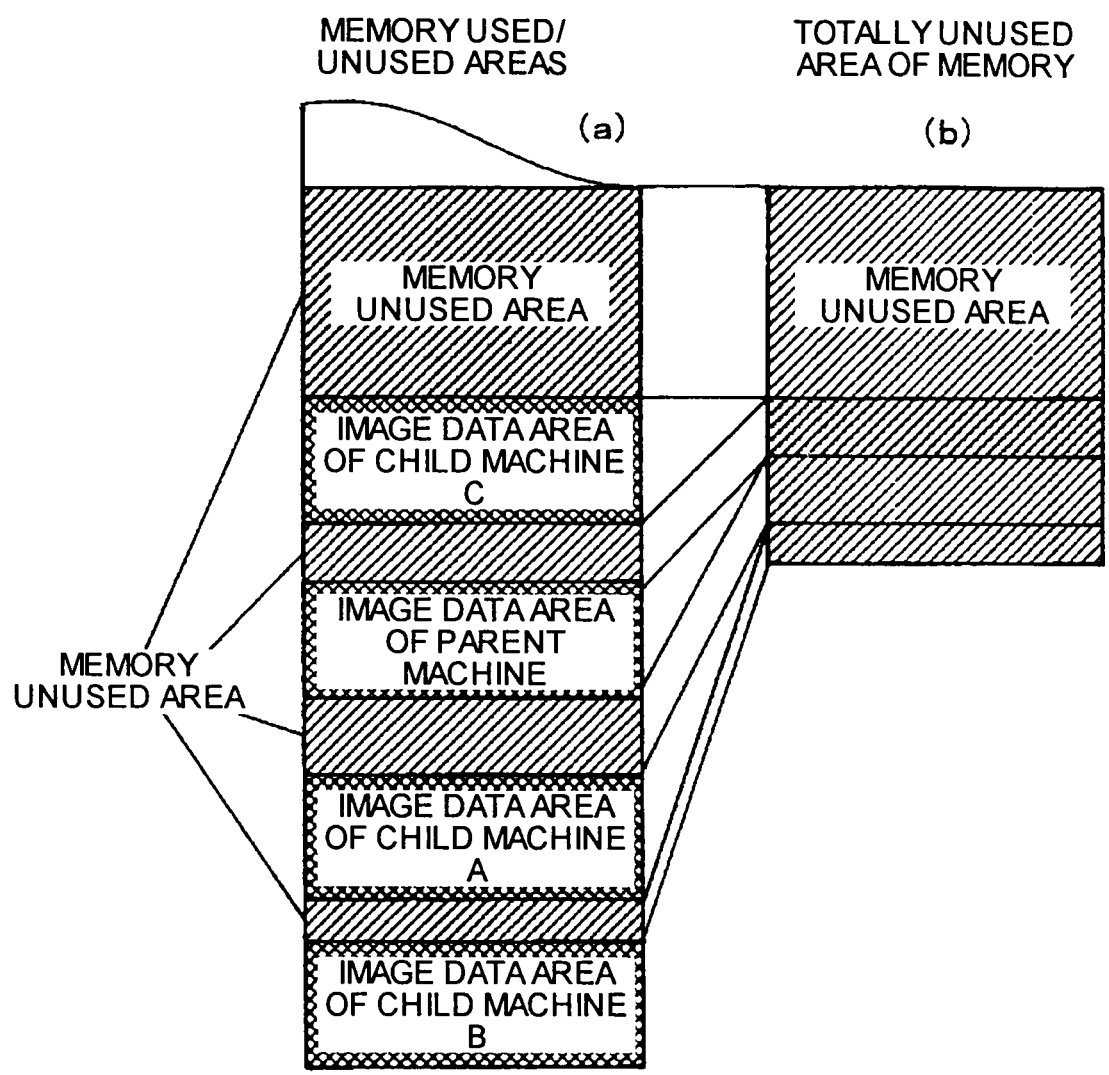
FIG. 12 illustrates an example of a control of image data storing to the MEM-C 205 or the HDD 207 when a memory management mode is set in a digital copying machine that is set as a parent machine.
Figure 13:
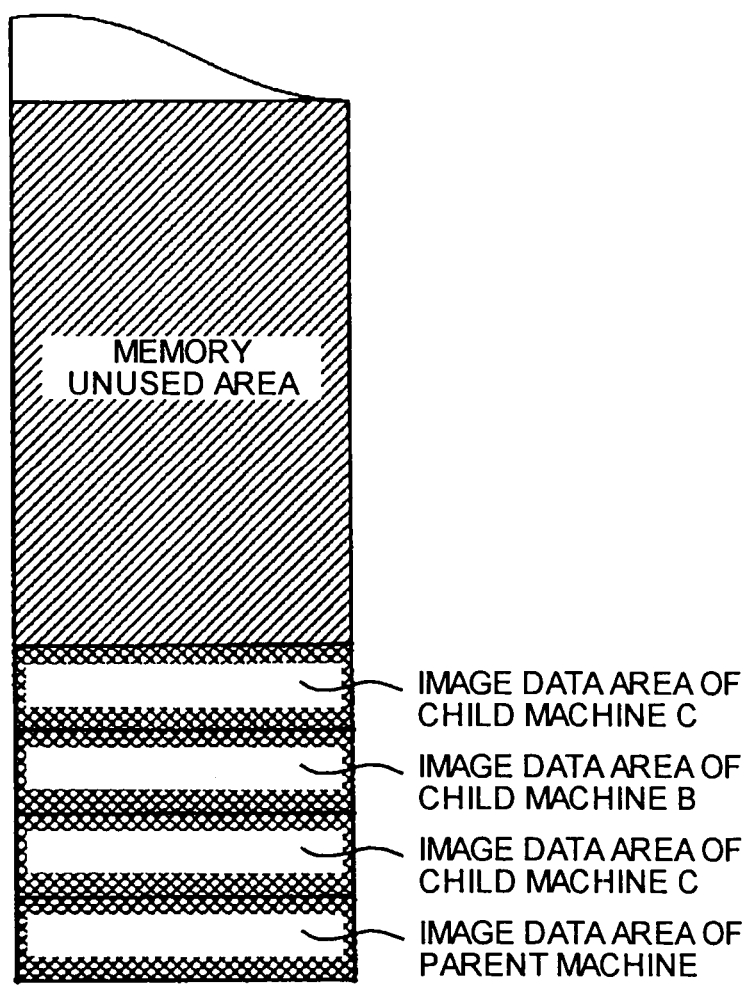
FIG. 13 illustrates another example of a control of image data storing to the MEM-C 205 or the HDD 207 when a memory management mode is set in a digital copying machine that is set as a parent machine.

FIG. 12 and FIG. 13 are explanatory diagrams of different memory controls of image data to the MEM-C 205 or the HDD 207 when the memory management mode is set in the digital copying machine set as a parent machine among the digital copying machines 601 to 604. The digital copying machine 601 set as the parent machine.

The fourth embodiment is substantially the same as the first to third embodiments. In the first to third embodiments, the memory control of the image data to the MEM-C 205 or the HDD 207 of the own machine that the CPU 201 of the parent machine carries out corresponding to the presence or absence of the setting of the memory management mode is not explained in detail. Therefore, in the fourth embodiment, the memory control will be explained in detail. For convenience, the explanation of the compression and expansion of the image data will be omitted.

The user presses the key on the operation section 30 of the own machine, to set the own machine as a parent machine, and set the other digital copying machines 601 to 604 as child machines respectively. At the same time, the user sets the memory management mode. Then, the CPU 201 of the digital copying machine 601 secures a memory area in advance to continuously store into the MEM-C 205 or the HDD 207 of the own machine, the image data read by the scanner 50 of the own machine and the image data read by the scanners 50 of the child machines A, B, and C (corresponding to the other digital copying machines 602, 603, and 604) respectively in the order of pages of the document.

The user of the parent machine sets pages 1 to 100 of the document to the document tray 2 of the ADF 1 of the parent machine, sets pages 101 to 200 of the document to the document tray 2 of the ADF 1 of the child machine B, sets pages 201 to 300 of the document to the document tray 2 of the ADF 1 of the child machine C, and sets pages 301 to 400 of the document to the document tray 2 of the ADF 1 of the child machine D, respectively, for example. The user of the own machine presses the key on the operation section 30 to input these pieces of information. Then, the CPU 201 of the parent machine stores the input information as a data table into a predetermined memory area of the MEM-C 205 or the HDD 207 of the own machine, and registers the information.

The user presses the print key 34 in a state that a large number of sheets of original document (for example, pages 1 to 400) are uniformly allocated to the document tray 2 of the ADF 1 of the own machine and the document trays 2 of the ADFs 1 of child machines A, B, and C respectively. Then, the CPU 201 of the digital copying machine 601 makes the ADF 1 of the own machine automatically feed each sheet of original document from the document tray 2, and makes the scanner 50 of the own machine sequentially read the image from the document. The CPU 201 makes the images stored in page order from the header address, into a memory area secured in advance of the MEM-C 205 or the HDD 207 of the own machine via the engine ASIC 301, the PCI bus 500, and the controller ASIC 206 as shown in FIG. 7 or FIG. 8. At the same time, the CPU 201 makes the ADF 1 of the child machine automatically feed each sheet of original document from the document tray 2, and makes the scanners 50 of child machines A, B, and C sequentially read the images from the document respectively. The CPU 201 makes the IEEE13941/F400 of the child machines A, B, and C sequentially transfer the document image data to the own machine. The CPU 201 makes the images stored in page order into a remaining area the memory area secured in advance of the MEM-C 205 or the HDD 207 of the own machine (at steps S1, S2, and S7 to S12).

The CPU 201 of the parent machine makes each image data of the document read by the scanner 50 of the own machine stored in page order from the header address, into a memory area secured in advance of the MEM-C 205 or the HDD 207 of the own machine, as shown in FIG. 13. The CPUs 201 of the child machines A, B, and C make each image data of the document read by the scanners 50 of the own machines temporarily stored in page order into an optional memory area of the MEM-C 205 or the HDD 207 of the own machines, as shown in FIGS. 11B, 11C, and 11D respectively, for example. When the scanners 50 of the own machines end reading the images from the document, the CPUs 201 make the IEEE13941/F400 of the own machine sequentially notify the end of the reading to the parent machine.

When the scanner 50 of the own machine ends reading the images from the pages 1 to 100 of the document and also when the parent machine receives the notification of the end of reading from the child machines A, B, and C respectively, the CPU 201 of the parent machine judges that all the images are read from the document. The CPU 201 determines an order of transmitting an image transfer instruction to the child machines A, B, and C, by referring to the data table. The CPU 201 makes the IEEE13941/F400 of the own machine transmit the image transfer instruction to the child machines A, B, and C in this order.

The CPUs 201 of the child machines A, B, and C receive the image transfer instruction transmitted from the parent machine, and make the IEEE13941/F400 of the own machine transfer in page order the image data of the document stored in the MEM-C 205 or the HDD 207 of the own machine.

When all the images of the document are read and also when the order of transmitting the image transfer instruction is determined, the CPU 201 of the parent machine first makes the IEEE13941/F400 of the own machine transmit the image transfer instruction to the child machine A. The child machine A transfers the image data of the document in page order from page 101 to 200, to the parent machine. Then, the CPU 201 of the parent machine makes the reception data sequentially stored into the memory area secured in advance of the MEM-C 205 or the HDD 207 of the own machine, following the image data of the own (i.e., parent) machine, as shown in FIG. 13.

The CPU 201 of the parent machine makes the IEEE13941/F400 of the own machine transmit the image transfer instruction to the child machine B. The child machine B transfers the image data of the document in the order of pages from page 201 to 300, to the parent machine. Then, the CPU 201 of the parent machine makes the reception data sequentially stored into the memory area secured in advance of the MEM-C 205 or the HDD 207 of the own machine, following the image data of the child machine A, as shown in FIG. 13.

Last, the CPU 201 of the parent machine makes the IEEE13941/F400 of the own machine transmit the image transfer instruction to the child machine C. The child machine C transfers the image data of the document in the order of pages from page 301 to 400, to the parent machine. Then, the CPU 201 of the parent machine makes the reception data sequentially stored into the memory area secured in advance of the MEM-C 205 or the HDD 207 of the own machine, following the image data of the child machine B, as shown in FIG. 13.

On the other hand, when the memory management mode is not set, the user presses the print key 34 in a state that a large number of sheets of original document are uniformly allocated to the document tray 2 of the ADF 1 of the own machine and the document trays 2 of the ADF 1 of child machines A, B, and C. Then, the CPU 201 of the parent machine makes the ADF 1 of the own machine automatically feed each sheet of original document from the document tray 2, and makes the scanner 50 of the own machine sequentially read the image from the document. The CPU 201 makes each image data stored, in the page order, into an optional memory area of the MEM-C 205 or the HDD 207 of the own machine via the engine ASIC 301, the PCI bus 500, and the controller ASIC 206 as shown in FIG. 7 or FIG. 8. At the same time, the CPU 201 makes the ADFs 1 of the child machines A, B, and C automatically feed each sheet of original document from the document tray 2, and makes the scanners 50 of the child machines A, B, and C sequentially read the images from the document respectively. The CPU 201 makes the IEEE13941/F400 of the child machines sequentially transfer the document image data to the own machine, and makes the images stored into an optional memory area of the MEM-C 205 or the HDD 207 of the own machine (at steps S1, S2, and S7 to S12). The CPU 201 of the parent machine makes each image data of the document read by the scanner 50 of the own machine stored in page order into an optional memory area of the MEM-C 205 or the HDD 207 of the own machine. The CPUs 201 of the child machines A, B, and C make each image data of the document read by the scanner 50 of the own machine temporarily stored into an optional memory area of the MEM-C 205 or the HDD 207 of the own machine, as shown in FIGS. 11B, 11C, and 11D respectively, for example. The CPU 201 makes the IEEE13941/F400 of the own machine sequentially transfer the stored images to the parent machine.

The child machines A, B, and C transfer the image data of the document in page order to the parent machine. The CPU 201 of the parent machine makes the image data sequentially stored into an optional area of the MEM-C 205 or the HDD 207 of the own machine.

When the user sets the memory management mode, the CPU 201 of the own machine can secure a memory area for each copying machine in advance to store into the MEM-C 205 or the HDD 207 of the own machine, the image data read by the scanner 50 of the own machine and the image data read by the scanners 50 of the child machines A, B, and C (corresponding to the other digital copying machines 602, 603, and 604) respectively.

The user of the parent machine sets pages 1 to 100 of the document to the document tray 2 of the ADF 1 of the parent machine, sets pages 101 to 200 of the document to the document tray 2 of the ADF 1 of the child machine B, sets pages 201 to 300 of the document to the document tray 2 of the ADF 1 of the child machine C, and sets pages 301 to 400 of the document to the document tray 2 of the ADF 1 of the child machine D, respectively, for example. The user of the own machine presses the key on the operation section 30 to input these pieces of information. Then, the CPU 201 of the parent machine stores the input information as a data table into a predetermined memory area of the MEM-C 205 or the HDD 207 of the own machine, and registers the information.

The user presses the print key 34 in a state that a large number of sheets of original document (for example, pages 1 to 400) are uniformly allocated to the document tray 2 of the ADF 1 of the own machine and the document trays 2 of the ADFs 1 of child machines A, B, and C respectively. Then, the CPU 201 of the digital copying machine 601 makes the ADF 1 of the own machine automatically feed each sheet of original document from the document tray 2, and makes the scanner 50 of the own machine sequentially read the image from the document. The CPU 201 makes the scanner 50 of the own machine sequentially read the images, and makes these images stored in page order into a memory area secured in advance of the MEM-C 205 or the HDD 207 of the own machine via the engine ASIC 301, the PCI bus 500, and the controller ASIC 206 as shown in FIG. 7 or FIG. 8. At the same time, the CPU 201 makes the ADFs 1 of the child machines A, B, and C automatically feed each sheet of original document from the document tray 2, and makes the scanners 50 of child machines A, B, and C sequentially read the images from the document respectively. The CPU 201 makes the IEEE13941/F400 of the child machines A, B, and C sequentially transfer the document image data to the own machine. The CPU 201 makes the images stored in page order into a memory area secured in advance of the MEM-C 205 or the HDD 207 of the own machine (at steps S1, S2, and S7 to S12). The CPU 201 of the parent machine makes each image data of the document read by the scanner 50 of the own machine stored in page order into a memory area secured in advance of the MEM-C 205 or the HDD 207 of the own machine, as shown in FIG. 12A. The CPUs 201 of the child machines A, B, and C make each image data of the document read by the scanners 50 of the own machines temporarily stored in page order into an optional memory area of the MEM-C 205 or the HDD 207 of the own machines, as shown in FIGS. 11B, 11C, and 11D respectively. When the scanners 50 of the own machines end reading the images from the document, the CPUs 201 make the IEEE13941/F400 of the own machines sequentially transfer the stored images to the parent machine.

The child machines A, B, and C transfer the image data of the document in page order to the parent machine. The CPU 201 of the parent machine makes the image data sequentially stored into an area secured in advance of the MEM-C 205 or the HDD 207 of the own machine as shown in FIG. 12A.

Based on the setting of the memory management mode, the CPU 201 of the own machine secures a memory area for each copying machine in advance to store the image data read by the scanner 50 of the own machine and the image data read by the scanners 50 of the child machines A, B, and C into the MEM-C 205 or the HDD 207 of the own machine. In this case, the CPU 201 of each child machine can omit the work of assigning an address each time when transferring the image data to the parent machine. Further, the child machine can continuously transfer the image data of the document, which has an advantage of being able to deliver image data between the copying machines. However, this also has a problem of securing a memory area more than is necessary to store the image data into the MEM-C 205 or the HDD 207. As the memory area to be used is determined at random, there is a risk that a memory area not used between the image data memory area by copying machines becomes small.

To avoid the above problems, the following arrangement is made. Based on the setting of the memory management mode, the CPU 201 of the digital copying machine 601 secures a memory area in advance to store sequentially in page order of the document the image data read by the scanner 50 of the own machine and the image data read by the scanners 50 of the child machines A, B, and C into the MEM-C 205 or the HDD 207 of the own machine, as shown in FIG. 13. With this arrangement, an excessive allocation of a memory area for each copying machine can be avoided.

Further, a memory area not used between the image data memory area by copying machines is not prepared as shown in FIG. 12B. Consequently, a used area can be prepared in one large block.

Further, a large amount of image data can be stored into a continuous memory area of the MEM-C 205 or the HDD 207. Therefore, the image data read by the scanner 50 of the own machine and the image data read by the scanners 50 of the child machines A, B, and C can be stored quickly.

Further, a large amount of document image data including the image data read by the scanner 50 of the own machine and the image data read by the scanners 50 of the child machines A, B, and C can be stored sequentially in page order into a continuous memory area of the MEM-C 205 or the HDD 207. At the time of printing out the registered image data again, the document image data need not be sorted. As the document image data is stored continuously, the image data can be efficiently transferred to the plotter 80.

In the above embodiments, the image data read by the scanner 50 of the digital copying machine 601 as the parent machine is stored as it is or is stored by compression into the MEM-C 205 or the HDD 207 of the own machine. However, the image data read by the scanner 50 of the parent machine can also be stored into the MEM-C 205 or the HDD 207 of the own machine after the image data is edited instead of being compressed.

Further, a recording medium such as a computer-readable optical disk like a CD-ROM that is recorded with a program to make the CPU 201 (i.e., computer) execute functions of the present invention to control the digital copying machines 601 to 604 can also be provided.

Therefore, when a reading unit such as an optical disk unit that reads the program from the recording medium is provided in or attached externally to the digital copying machines 601 to 604, the recording medium such as an optical disk can be mounted on this reading unit. The reading unit reads the program stored in the recording medium, and installs the program into the HDD 207 inside the machines. With this arrangement, the functions of the present invention can be achieved.

The application of the present invention to the digital copying machine and the image forming apparatus having a plurality of these copying machines connected together via a communication line is explained in the above embodiments. However, the application of the present invention is not limited to the above. The present invention can also be applied to other image forming apparatus such as a digital multifunction machine having a copying function, and a facsimile. The invention can also be applied to an image forming system having a plurality of image forming apparatuses connected together via a communication line.

As explained above, according to the present invention, the user' operation efficiency can be improved, and the copying time can be shortened when making a copy of a large amount of document.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming system comprising:
    a first image forming apparatus and a second image forming apparatus that are connected to each other via a communication line,
    the first image forming apparatus including
        a first image reading unit that reads image data from a document;
    the second image forming apparatus including
        a second image reading unit that reads image data from a document,
        an image storing unit that stores the image data, and
        a parallel reading controller configured to concurrently
            make the second image reading unit read second image data from a second document that is set on the second image reading unit, and
            make the first image reading unit of the first image forming apparatus read first image data from a first document that is set on the first image reading unit, and transfer the first image data to the second image forming apparatus,
        the parallel reading controller further configured to make the image storing unit sequentially arrange the second image data and the transferred first image data and store the sequentially arranged first and second image data such that the first image data of each page of the first document is collectively stored, independent of a collective storing of the second image data of each page of the second document,
    wherein the parallel reading controller includes a storing unit that stores image data in a pre-secured memory area of the image storing unit, and
    wherein the parallel reading controller further includes an area securing unit that secures in advance the pre-secured memory area in the second image storing unit in which image data read by the second image reading unit and image data read by the first image reading unit are stored continuously,
    wherein the first document and the second document comprise a third document having a predetermined page order, and wherein the parallel reading controller is further configured to make the image storing unit arrange separate pre-secured memory area for the second image data and separate pre-secured memory area for the transferred first image data based on the predetermined page order of the third document, and wherein the separate pre-secured memory areas are arranged such that the predetermined page order is maintained in storage within the image storage unit even while the first image data of the first document is stored independently from the second image data of the second document.

2. The image forming system according to claim 1, wherein
    the first image forming apparatus further includes a first automatic document feeder that automatically feeds a plurality of pages to the first image reading unit one by one,
    the second image forming apparatus further includes a second automatic document feeder that automatically feeds a plurality of pages to the second image reading unit one by one, and
    the parallel reading controller controls operations of the first automatic document feeder and the second automatic document feeder concurrently.

3. The image forming system according to claim 1, wherein
    the second image forming apparatus further includes a parallel image forming controller that performs concurrently
        a control of reading image data stored in the image storing unit, and making the second image forming apparatus form an image based on the image data, and
        a control of reading image data stored in the image storing unit, transferring the image data to the first image forming apparatus, and making the first image forming apparatus form an image based on the image data.

4. The image forming system according to claim 3, wherein
    the first image forming apparatus further includes
        a data expansion unit that expands compressed image data;
    the second image forming apparatus further includes
        a data compression unit that compresses image data;
    the parallel reading controller controls the data compression unit to compress the image data, and
    the parallel image forming controller includes an expansion controller that controls the data expansion unit to expand the image data.

5. The image forming system according to claim 4, wherein
    the second image forming apparatus further includes a second expansion unit that expands compressed image data, and
    the expansion controller controls the second expansion unit to expand compressed image data to be formed into an image at the second image forming apparatus, and controls the first expansion unit to expand compressed image data transferred to the first image forming apparatus.

6. The image forming system according to claim 1, wherein the parallel reading controller includes the storing unit that stores image data in an arbitrary memory area of the image storing unit.

7. The image forming system according to claim 1, wherein the parallel reading controller further includes
- a temporary storing unit that temporarily stores the image data read by the first image reading unit in the image storing unit;
- a storing unit that stores the image data read by the second image reading unit in the memory area secured by the area securing unit; and
- a residual storing unit that makes the first image forming apparatus transfer image data stored in the image storing unit when the first image reading unit and the second image reading unit complete reading all the images from the document, and stores the image data transferred in a remaining area of the image storing unit.

8. The image forming system according to claim 1, wherein the second image forming apparatus further comprises a mode setting unit that sets a memory management mode for managing the second image storing unit, and
the parallel reading controller further includes
- a first memory controller that stores image data into an arbitrary memory area of the image storing unit;
- a second memory controller that stores image data into a pre-secured memory area of the image storing unit; and
- an area selection unit that checks a status of the memory management mode, selects the first memory controller if the memory management is not set, and selects the second memory controller if the memory management is set.

9. The image forming apparatus according to claim 1, wherein the communication line is based on a communication interface conforming the Institute of Electrical and Electronic Engineers 1394 standard.

10. A method of copying employed on a system including a plurality of image forming apparatuses connected to each other via a communication line, the method comprising: setting one of the image forming apparatuses as a master image forming apparatus, and image forming apparatuses other than the master image forming apparatus as slave image forming apparatuses; acquiring, using the master image forming apparatus, second image data of a second document from the slave image forming apparatus; sequentially arranging, at the master image forming apparatus, first image data of a first document acquired by the master image forming apparatus and the second image data of the second document acquired from the slave image forming apparatus; securing, in advance, a pre-secured memory area in the master image forming apparatus, in which acquired first and second image data are stored continuously; storing, as image data and in the pre-secured memory area of the master image forming apparatus, the first image data acquired by the master image forming apparatus and the second image data acquired from the slave image forming apparatus such that the first image data of each page of the first document is collectively stored, independent of a collective storing of the second image data of each page of the second document; transferring, from the master image forming apparatus, a part of the stored image data to a desired one of the slave image forming apparatuses; and forming, using the master image forming apparatus, an image based on image data remaining in the stored arranged image data and forming, using the slave image forming apparatus, to which the part of the image data is transferred, an image based on the part of the image data which was transferred, the forming being performed concurrently, wherein the first document and the second document comprise a third document having a predetermined page order, and arranging separate pre-secured memory area for the second image data and separate pre-secured memory area for the transferred first image data based on the predetermined page order of the third document, and wherein the separate pre-secured memory areas are arranged such that the predetermined page order is maintained in storage within the master image forming apparatus even while the first image data of the first document is stored independently from the second image data of the second document.

11. The method according to claim 10, wherein the slave image forming apparatus includes an automatic document feeder, and the method further comprising:
- making the master image forming apparatus control an operation of the automatic document feeder of the slave image forming apparatus.

12. A non-transitory computer readable medium having stored thereon a computer program employed on a system including a plurality of image forming apparatuses connected to each other via a communication line, the computer program making the computer execute: setting one of the image forming apparatuses as a master image forming apparatus, and image forming apparatuses other than the master image forming apparatus as slave image forming apparatuses; acquiring, using the master image forming apparatus, second image data of a second document from the slave image forming apparatus; sequentially arranging, at the master image forming apparatus, first image data of a first document acquired by the master image forming apparatus and the second image data of the second document acquired from the slave image forming apparatus; securing, in advance, a pre-secured memory area in the master image forming apparatus, in which acquired first and second image data are stored continuously; storing, as image data and in the pre-secured memory area of the master image forming apparatus, the first image data acquired by the master image forming apparatus and the second image data acquired from the slave image forming apparatus such that the first image data of each page of the first document is collectively stored, independent of a collective storing of the second image data of each page of the second document; transferring, from the master image forming apparatus, a part of the stored image data to a desired one of the slave image forming apparatuses; and forming, using the master image forming apparatus, an image based on image data remaining in the stored arranged image data and forming, using the slave image forming apparatus, to which the part of the image data is transferred, an image based on the part of the image data which was transferred, the forming being performed concurrently, wherein the first document and the second document comprise a third document having a predetermined page order, and arranging separate pre-secured memory area for the second image data and separate pre-secured memory area for the transferred first image data based on the predetermined page order of the third document, and wherein the separate pre-secured memory areas are arranged such that the predetermined page order is maintained in storage within the master image forming apparatus even while the first image data of the first document is stored independently from the second image data of the second document.

13. The non-transitory computer readable medium according to claim 12, wherein the slave image forming apparatus includes an automatic document feeder, and the program further making a computer execute
- making the master image forming apparatus control an operation of the automatic document feeder of the slave image forming apparatus.

* * * * *